(12) United States Patent
Didear et al.

(10) Patent No.: US 11,677,688 B2
(45) Date of Patent: Jun. 13, 2023

(54) AUGMENTED REALITY FOR INTERNET CONNECTIVITY INSTALLATION

(71) Applicant: Ubiquiti Inc., New York, NY (US)

(72) Inventors: Samuel Didear, Portland, OR (US); Koji Kanao, Brooklyn, NY (US); Robert J. Pera, Seattle, WA (US); Heqing Huang, Brooklyn, NY (US); Michael Anderson, Glenview, IL (US)

(73) Assignee: Ubiquiti Inc., New York, NY (US)

( * ) Notice: Subject to any disclaimer, the term of this patent is extended or adjusted under 35 U.S.C. 154(b) by 292 days.

(21) Appl. No.: 17/019,184

(22) Filed: Sep. 11, 2020

(65) Prior Publication Data

US 2021/0083992 A1    Mar. 18, 2021

Related U.S. Application Data

(60) Provisional application No. 62/900,403, filed on Sep. 13, 2019.

(51) Int. Cl.

| | |
|---|---|
| *H04L 49/00* | (2022.01) |
| *G06K 19/06* | (2006.01) |
| *G06T 19/00* | (2011.01) |
| *H04L 12/46* | (2006.01) |
| *G06V 20/20* | (2022.01) |
| *H04L 43/0811* | (2022.01) |

(Continued)

(52) U.S. Cl.
CPC ........ *H04L 49/70* (2013.01); *G06K 19/06028* (2013.01); *G06T 15/005* (2013.01); *G06T 19/006* (2013.01); *G06V 20/20* (2022.01); *H04L 12/4641* (2013.01); *H04L 43/0811* (2013.01); *H04L 45/02* (2013.01); *H04L 45/64* (2013.01); *H04L 67/75* (2022.05)

(58) Field of Classification Search
None
See application file for complete search history.

(56) References Cited

U.S. PATENT DOCUMENTS

| | | |
|---|---|---|
| 5,131,006 A | 7/1992 | Kamerman et al. |
| 5,151,920 A | 9/1992 | Haagh et al. |

(Continued)

FOREIGN PATENT DOCUMENTS

| | | |
|---|---|---|
| WO | WO98/40990 A1 | 9/1998 |
| WO | WO01/31855 A2 | 5/2001 |

(Continued)

*Primary Examiner* — Michael J Cobb
(74) *Attorney, Agent, or Firm* — Shay Glenn LLP

(57) ABSTRACT

Apparatuses (e.g., systems and devices) and methods to view otherwise hidden connectivity of networking devices. An electronic device such as a network device connected to a variety of different devices, may be observed through a real-time image onto which information about the connectivity and/or connections may be display to show identity, connectivity state and other information associated with ports of the network device(s). These methods may be implemented on a mobile device used to capture images of the network device and present an overlay of virtual objects on the captured images to a user in real time. The virtual objects may dynamically move or change shape in real time depending on the movement of the mobile device. One or more filtering techniques may be used to stabilize the virtual objects with respect to the captured images.

23 Claims, 33 Drawing Sheets

(51) Int. Cl.
*H04L 67/75* (2022.01)
*H04L 45/64* (2022.01)
*H04L 45/02* (2022.01)
*G06T 15/00* (2011.01)

(56) References Cited

U.S. PATENT DOCUMENTS

| | | |
|---|---|---|
| 5,295,154 A | 3/1994 | Meier et al. |
| 5,406,260 A | 4/1995 | Cummings et al. |
| 5,422,887 A | 6/1995 | Diepstraten et al. |
| 5,428,636 A | 6/1995 | Meier |
| 5,504,746 A | 4/1996 | Meier |
| 5,546,397 A | 8/1996 | Mahany |
| 5,706,428 A | 1/1998 | Boer et al. |
| 5,740,366 A | 4/1998 | Mahany et al. |
| 5,844,893 A | 12/1998 | Gollnick et al. |
| 5,936,542 A | 8/1999 | Kleinrock et al. |
| 5,940,771 A | 8/1999 | Gollnick et al. |
| 6,130,892 A | 10/2000 | Short et al. |
| 6,194,992 B1 | 2/2001 | Short et al. |
| 6,337,990 B1 | 1/2002 | Koshino |
| 6,374,311 B1 | 4/2002 | Mahany et al. |
| 6,563,786 B1 | 5/2003 | Van Nee |
| 6,636,894 B1 | 10/2003 | Short et al. |
| 6,665,536 B1 | 12/2003 | Mahany |
| 6,697,415 B1 | 2/2004 | Mahany |
| 6,714,559 B1 | 3/2004 | Meier |
| 6,789,110 B1 | 9/2004 | Short et al. |
| 6,795,852 B1 | 9/2004 | Kleinrock et al. |
| 6,810,426 B2 | 10/2004 | Mysore et al. |
| 6,857,009 B1 | 2/2005 | Ferreria et al. |
| 6,868,399 B1 | 3/2005 | Short et al. |
| 7,020,082 B2 | 3/2006 | Bhagavath et al. |
| 7,088,727 B1 | 8/2006 | Short et al. |
| 7,117,526 B1 | 10/2006 | Short |
| 7,194,554 B1 | 3/2007 | Short et al. |
| 7,197,556 B1 | 3/2007 | Short et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,739,383 B1 | 6/2010 | Short et al. |
| 7,752,334 B2 | 7/2010 | Paunikar et al. |
| 7,826,426 B1 | 11/2010 | Bharghavan et al. |
| 8,077,113 B2 | 12/2011 | Syed et al. |
| 8,190,708 B1 | 5/2012 | Short et al. |
| 8,335,272 B2 | 12/2012 | Roberts |
| 8,483,188 B2 | 7/2013 | Walton et al. |
| 8,934,495 B1 * | 1/2015 | Hilton ............... H04L 67/02 370/419 |
| 9,401,121 B2 | 7/2016 | Chen et al. |
| 2012/0249588 A1 * | 10/2012 | Tison ............... G06V 20/20 382/103 |
| 2017/0070594 A1 | 3/2017 | Oetting et al. |
| 2018/0004393 A1 * | 1/2018 | Ens ............... G06F 3/04815 |
| 2018/0077200 A1 * | 3/2018 | Apvrille ............ H04L 63/1416 |
| 2018/0083848 A1 * | 3/2018 | Siddiqi ............... H04L 43/08 |
| 2018/0130260 A1 | 5/2018 | Schmirler et al. |
| 2018/0158255 A1 * | 6/2018 | Garcia ............... B60Q 1/503 |
| 2019/0041637 A1 * | 2/2019 | German ............. G06T 19/006 |

FOREIGN PATENT DOCUMENTS

| | | |
|---|---|---|
| WO | WO01/31886 A2 | 5/2001 |
| WO | WO01/86877 A2 | 11/2001 |
| WO | WO2008/042804 A2 | 4/2008 |
| WO | WO2011/005710 A2 | 1/2011 |

\* cited by examiner

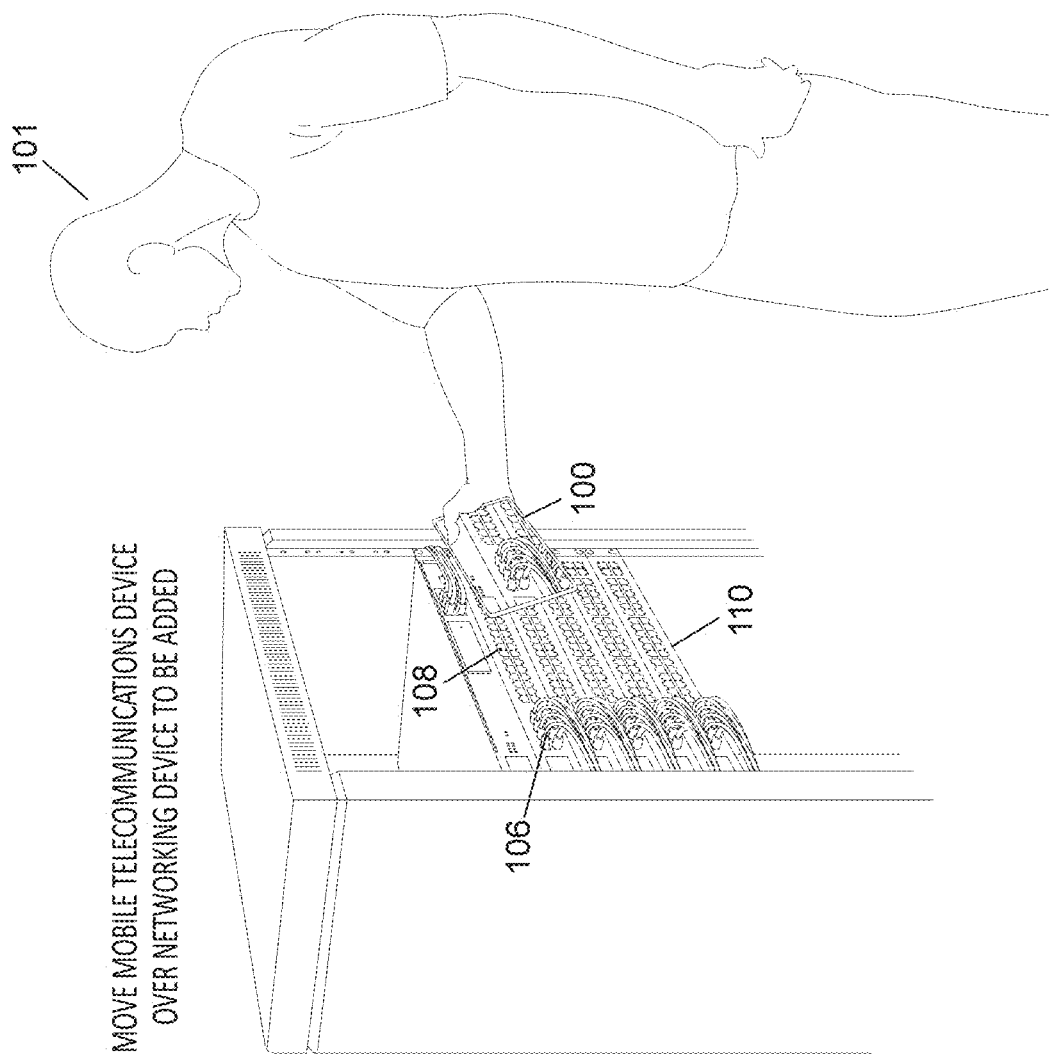
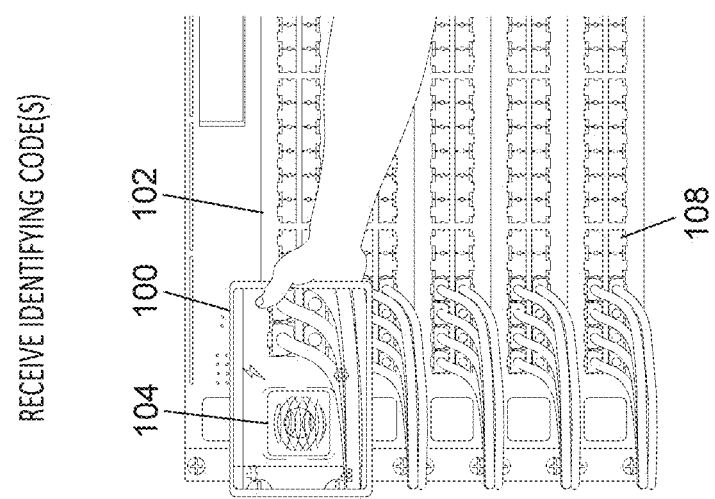
FIG. 1B
FIG. 1A

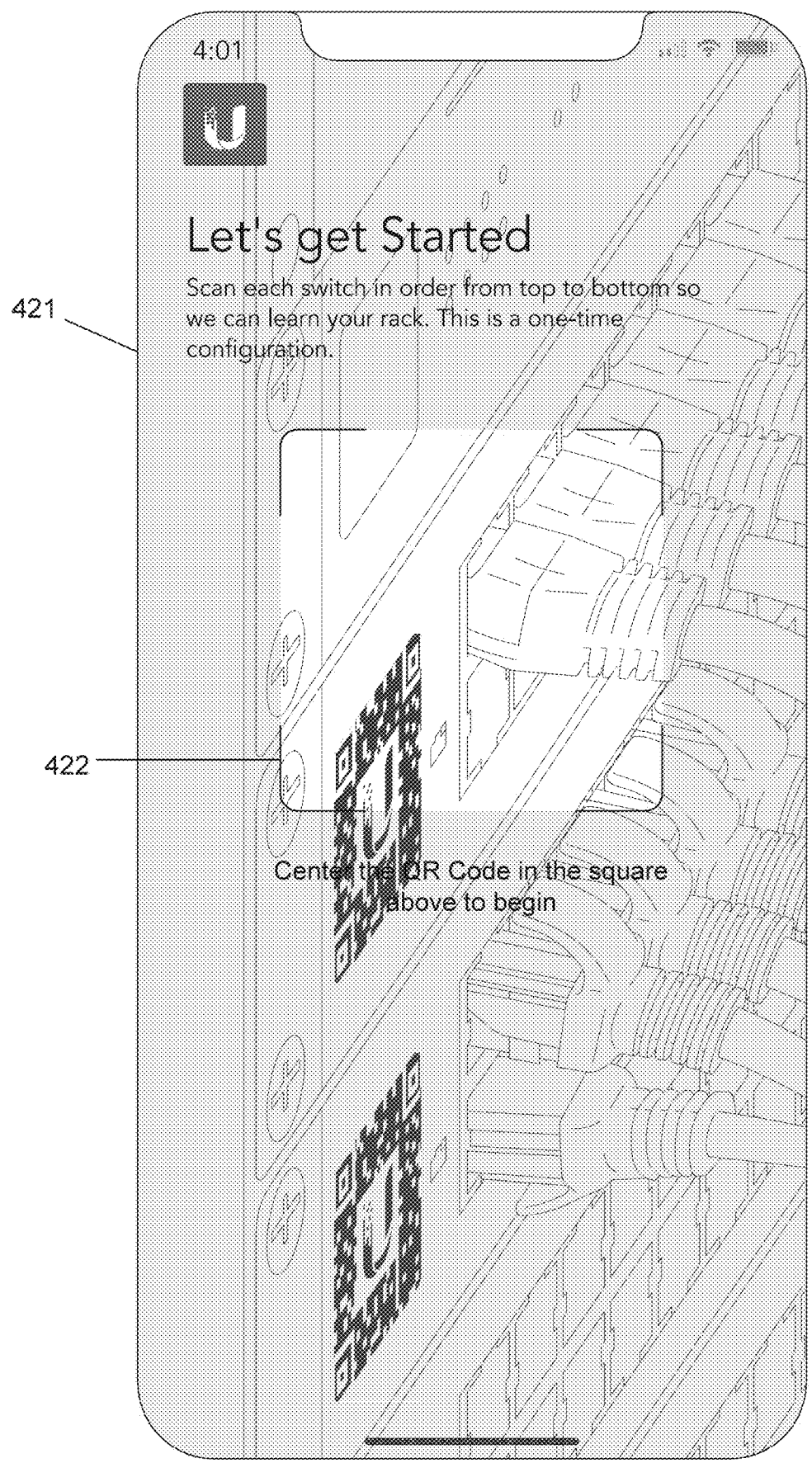
FIG. 4B1

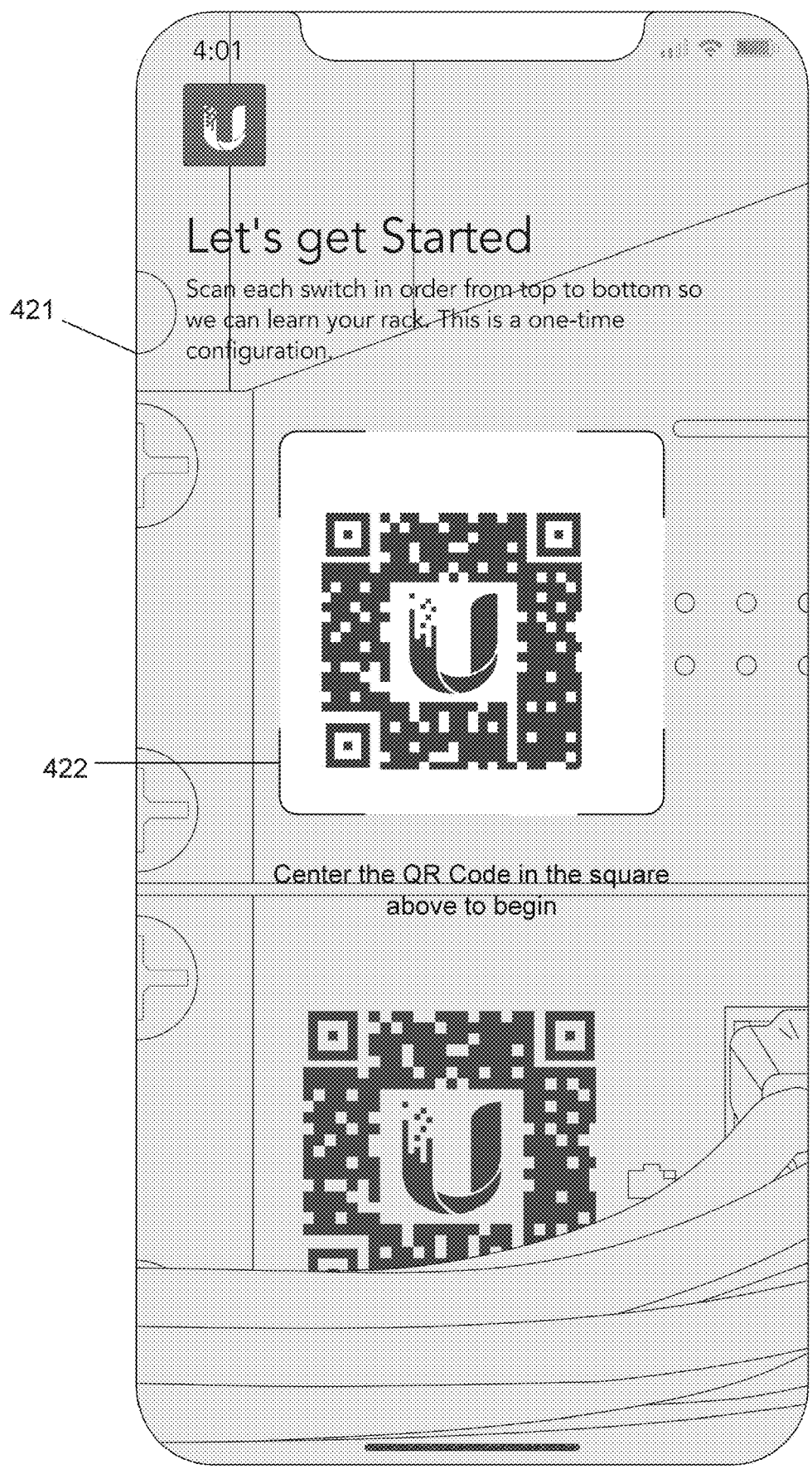
FIG. 4B2

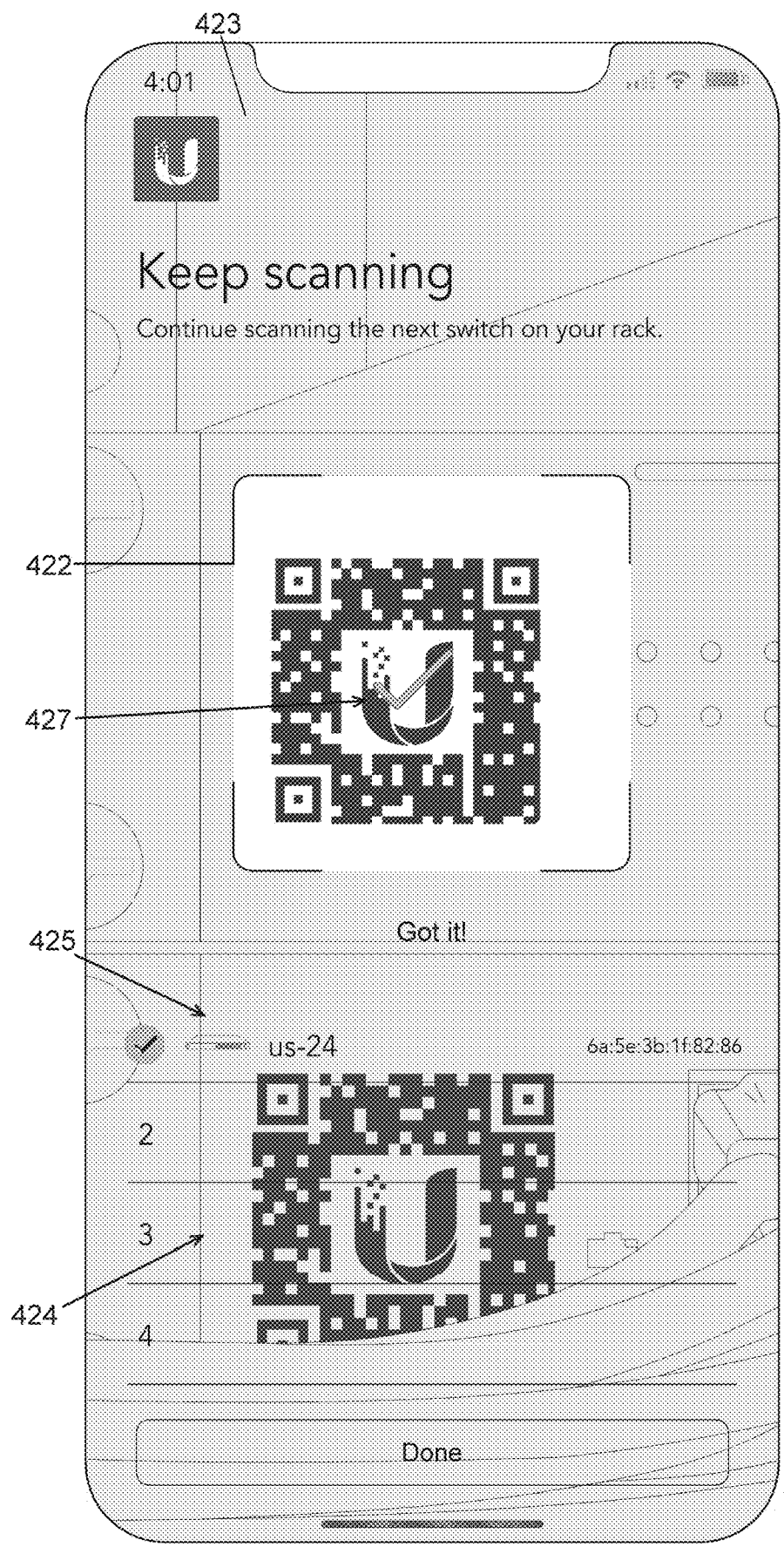
FIG. 4C1

FIG. 4C2

FIG. 4C3

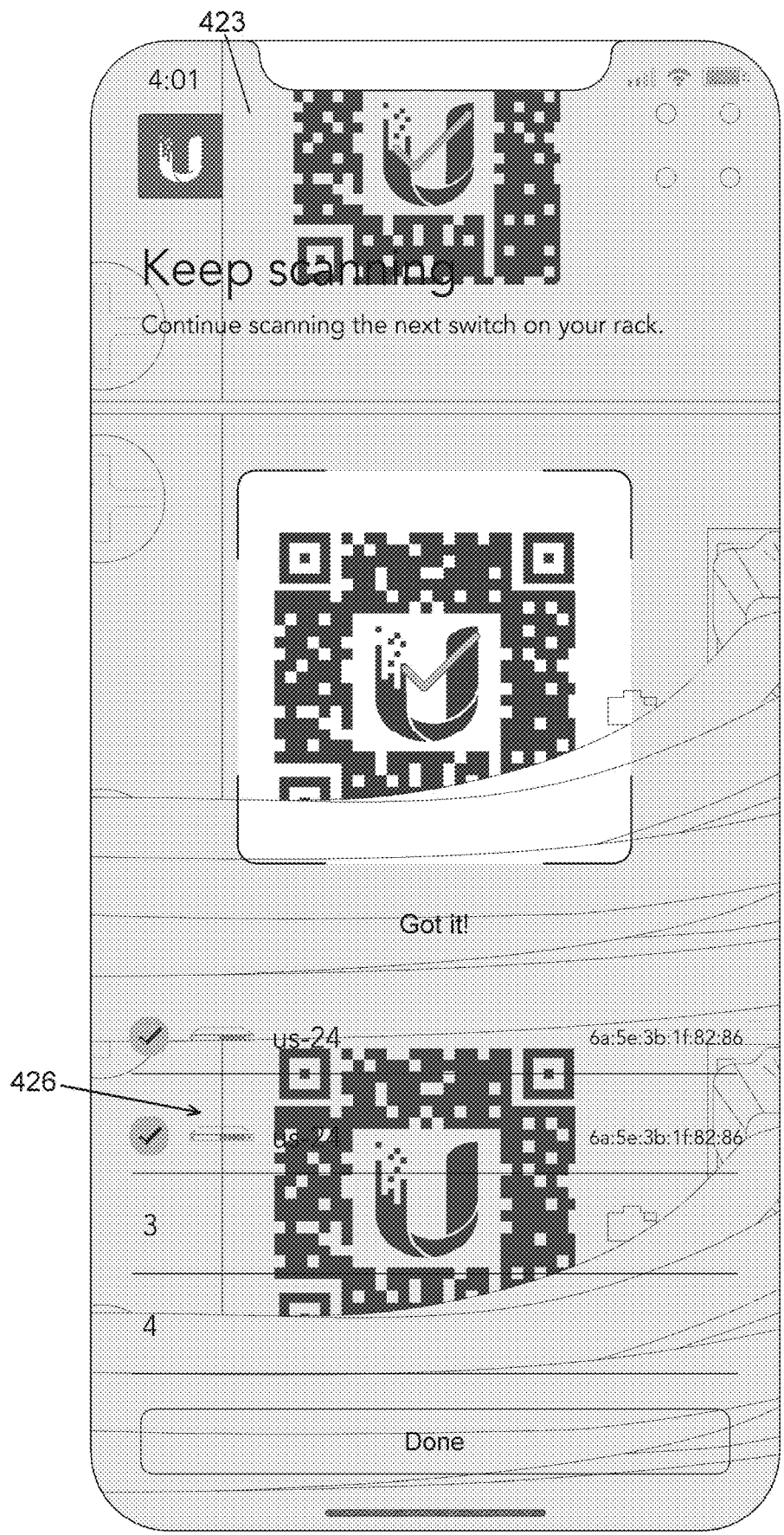
FIG. 4C4

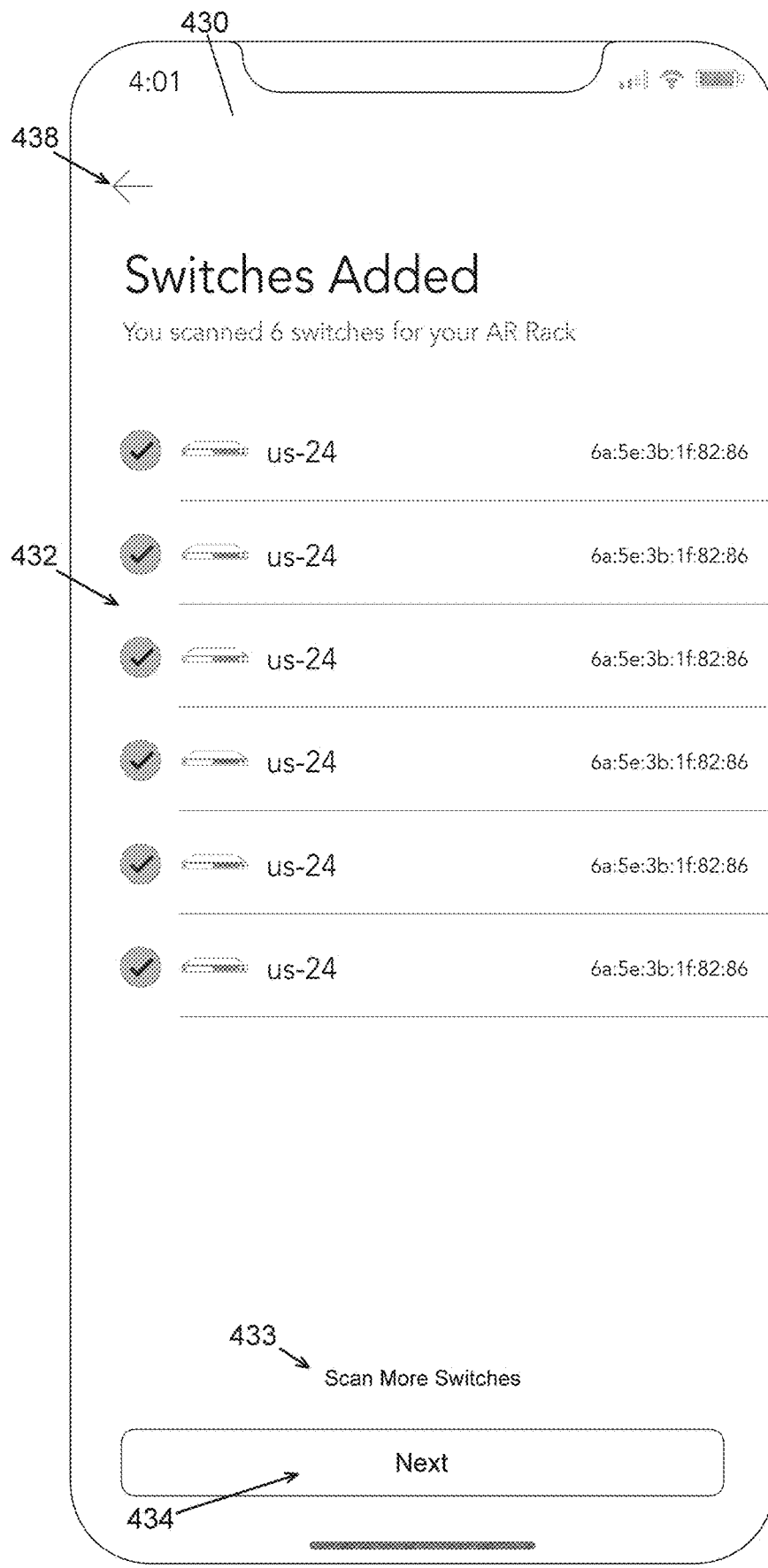
FIG. 4D1

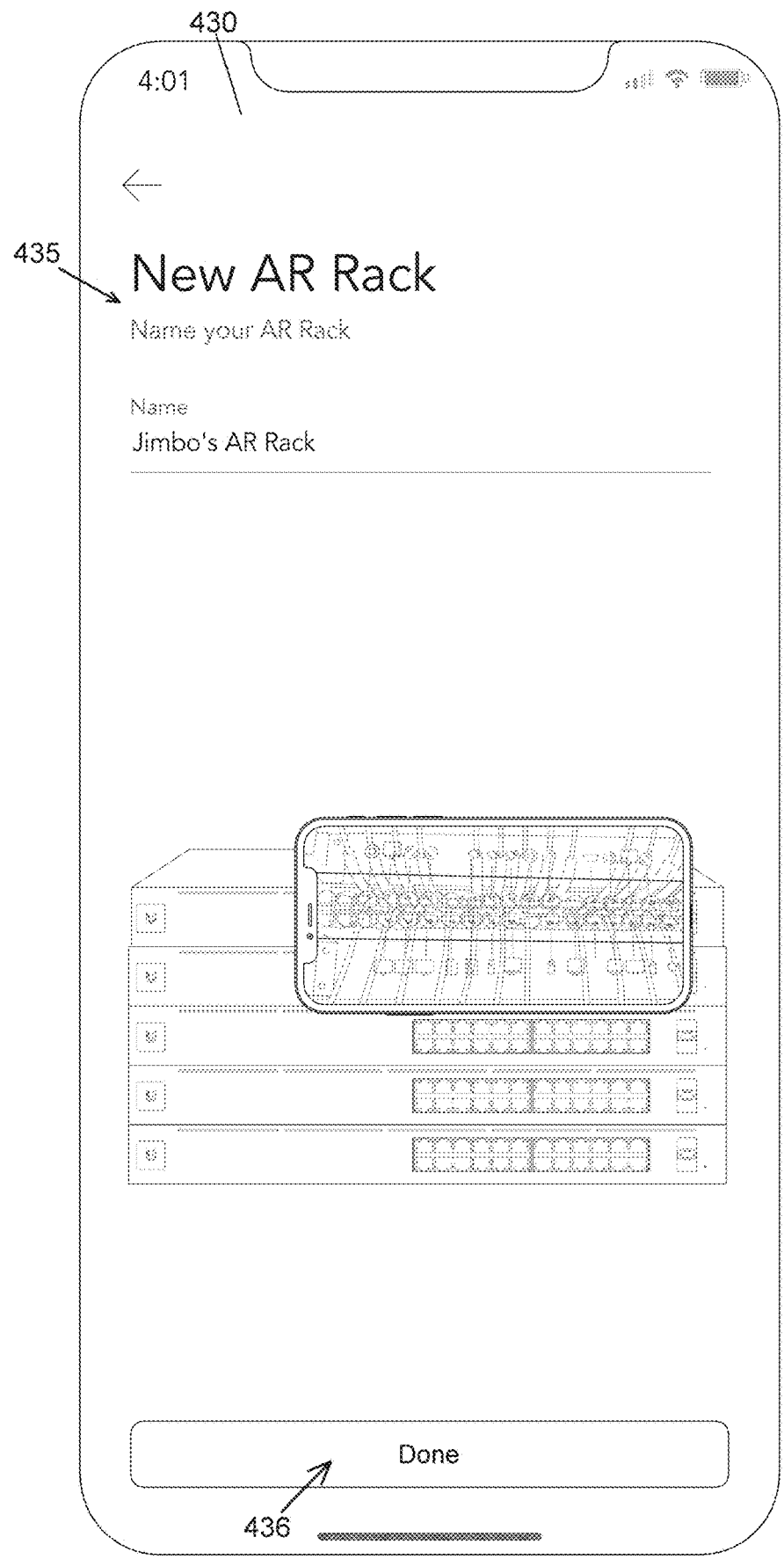
FIG. 4D2

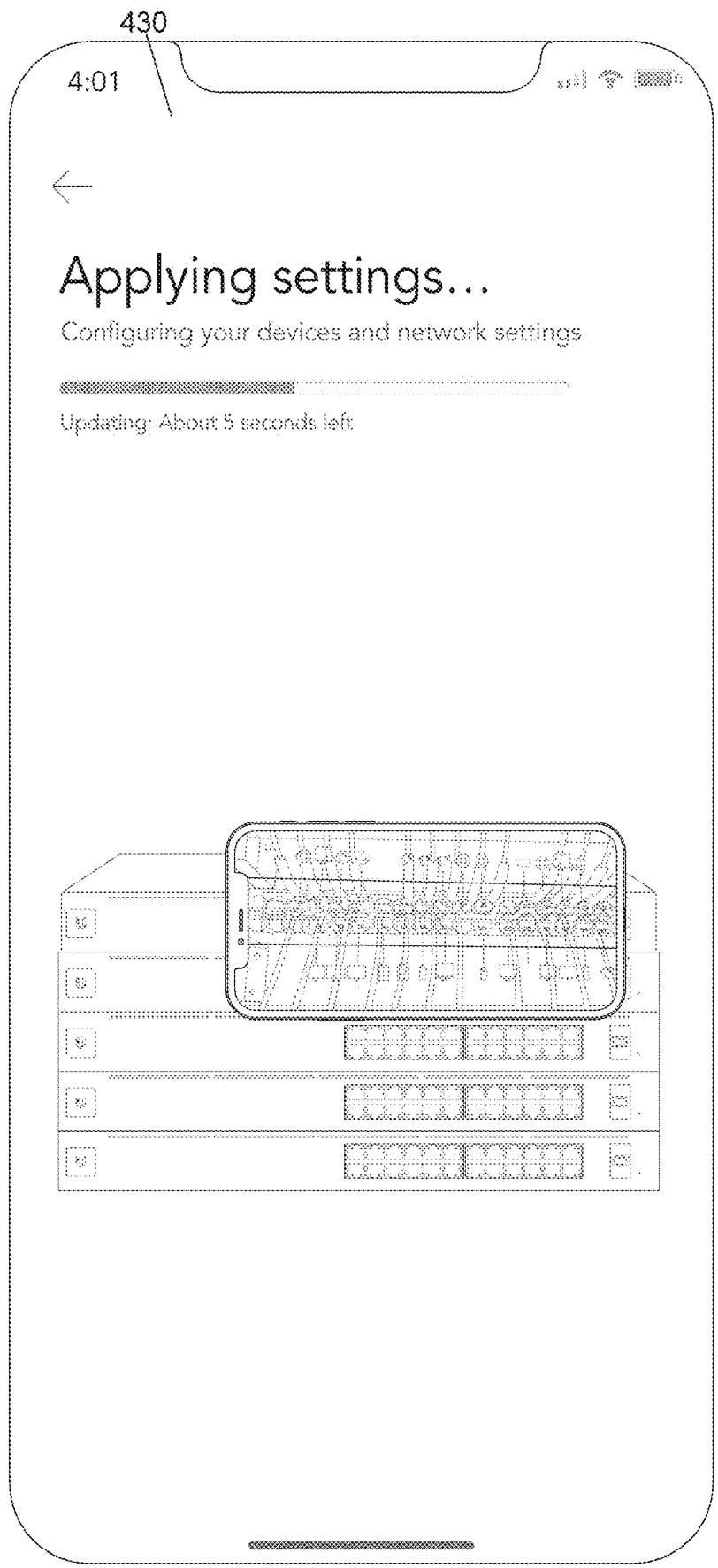
FIG. 4D3

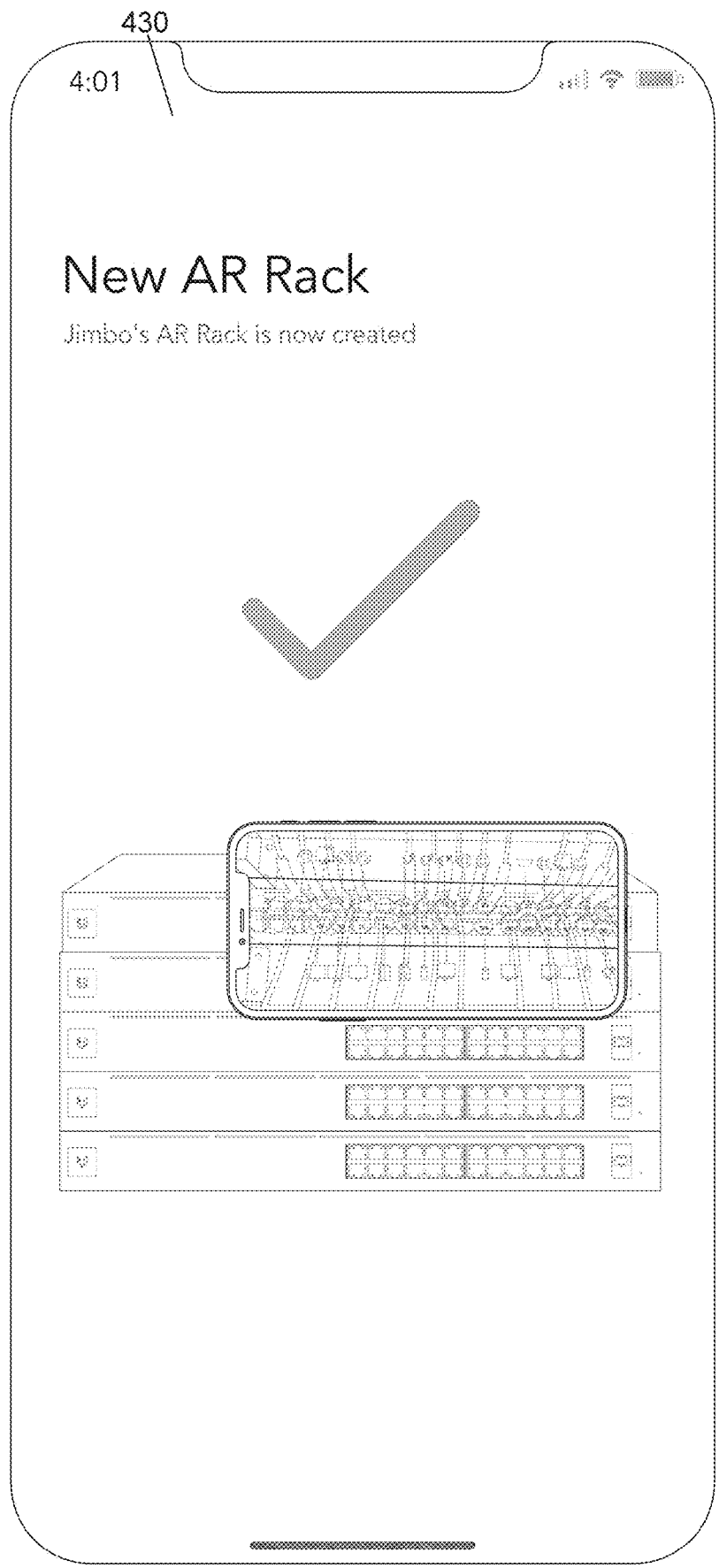
FIG. 4D4

```
{
    "name" : String,
    "_id" : String,
    "devices" : [
    {
      "mac" : String,
      "tracker_seed" : string,
      "position" : Vector3 (Key-Value-Pair/Object)
    }
  ]
}
```

FIG. 9C

```
{
    "name" : "test rack",
    "_id" : "1d4805da-45ed-4ffa-b4c0-9189712fa9fb",
    "devices" : [
      {
        "mac" : "fc:ec:da:77:46:99",
        "tracker_seed" : "tr_00",
        "position" : {
          "x" : 0,
          "y" : 0,
          "z" : 0
        }
      },
      {
        "mac" : "fc:ec:da:77:46:10",
        "tracker_seed" : "tr_01",
        "position" : {
          "x" : 0,
          "y" : -0.0465147719,
          "z" : 0
        }
      },
      {
        "mac" : "fc:ec:da:77:46:68",
        "tracker_seed" : "tr_02",
        "position" : {
          "x" : 0,
          "y" : -0.08837483,
          "z" : 0
        }
      }
    ]
}
```

FIG. 9E

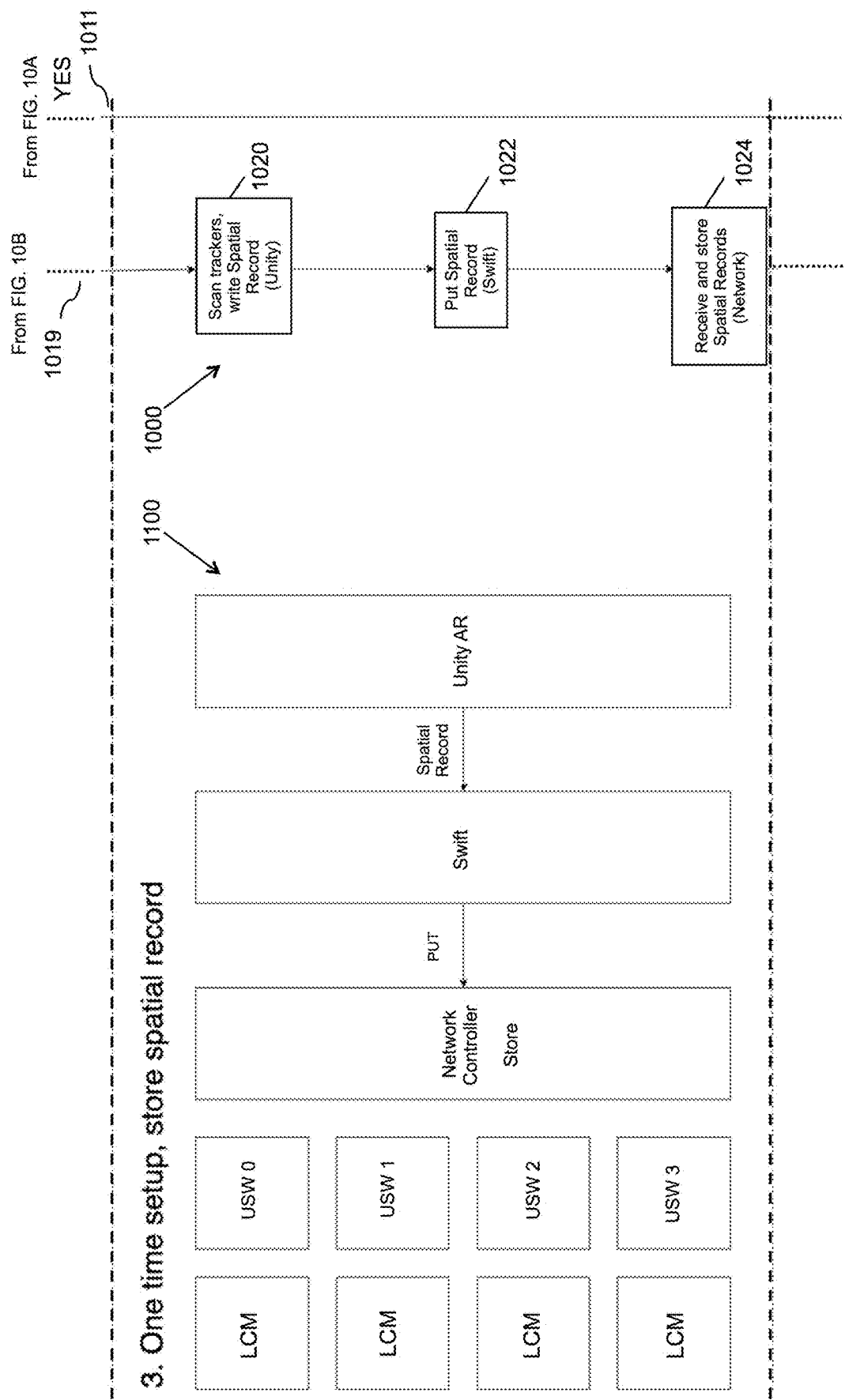

AUGMENTED REALITY FOR INTERNET CONNECTIVITY INSTALLATION

CROSS REFERENCE TO RELATED APPLICATIONS

This patent application claims priority to U.S. Provisional Patent Application No. 62/900,403, titled "AUGMENTED REALITY FOR INTERNET CONNECTIVITY INSTALLATION," filed on Sep. 13, 2019, and herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure is generally related to augmented reality applications especially as they relate to rendering augmented reality objects with images of network devices and related components including servers, switches, access points, routers and any of a number of other network related devices.

BACKGROUND

Computer networking equipment generally includes hardware devices which enable communication and interaction among devices on a computer network. Examples of networking devices generally include switches, routers, gateways and wireless access points which mediate data transmission in a computer network. When used in a business setting, network devices are typically used to connect various users' computers and office equipment, such as printers, to a local computer network and the internet. A network device is usually mounted in rack and organized in a stack with other various network devices. Sometimes the rack is housed in a separate temperature controlled room with other racks of network devices. An information technologist or technical specialist will connect cables to ports of the network devices to various other devices within a rack. At times, a network administrator will need to access one or more of the network devices in order to service or troubleshoot a problem. Typically, the ports and cables look the same or similar to each other. Thus, it can be difficult to identify which ports are used to connect which network devices when looking at the various cables and ports of network devices in a rack.

When used in a home setting, network devices are typically used to wirelessly connect various personal computers and other electronic devices to the internet. Consumers often set up their own internet connectivity by connecting various cables to the network devices, or in more complicated cases, hire specialists to correctly connect the network devices. Although user's manuals can be helpful, this process can be confusing especially to a non-expert. If internet connectivity is down, it can be difficult for a user to determine which devices are properly connected and operating without time-consuming troubleshooting. Further, today's advances and trends in home automation have seen the expansion of interconnectivity in the home environment. For example, real-time analytics, machine learning, sensor technologies, and embedded systems are converging to provide more monitoring and control of various household appliances and systems to provide a high level of home automation. For instance, lighting, HVAC (heating, ventilation, and air conditioning), appliances, security systems and other systems may be connected and centrally controlled thus providing improved convenience, comfort, energy efficiency and security (e.g., smart homes). As network connectively increases and becomes more complicated, installing and maintaining such networks will likely be more complicated.

In general, it would be beneficial to provide software, systems and/or devices that allow a user to more easily install, maintain and troubleshoot network devices and related components, whether in a business or home environment.

SUMMARY OF THE DISCLOSURE

Described herein are augmented reality (AR) systems and methods, including software, which may be used to visualize network connectivity and other hidden aspects of electronic devices. The systems and methods employ virtual objects as aids in the installation, maintenance, management, and/or repair of various components of a network. The systems and methods may be used by tech support staff or information technology (IT) administrators in maintaining an organization's wireless and/or wired network system. In some cases, the systems and methods are used by a personal consumer of a network device during installation or troubleshooting of a home or home office network environment.

Any of the methods, systems and devices described herein may be used in conjunction with a mobile device, such as a mobile phone, tablet computer, laptop computer or headset (e.g., virtual reality headset). For example, a user may use a camera of the mobile device to capture an image or multiple images (e.g., real-time imaging) of one or more network devices to view images of the network device(s) on a display of the mobile device. In some cases, the methods are encoded in an AR software application installed on and/or otherwise accessible by (e.g., via the internet) the mobile device. In some cases, the software may be configured to work in conjunction with other software (e.g., applications) accessible by the mobile device, such as commercially available AR software tools. Any AR software tool based on any operating system may be used. In some embodiments, the AR tools and features of the ARKit development platform developed by Apple Inc., headquartered in Cupertino, Calif., U.S.A., are used.

Although augmented reality techniques are known, the methods and systems described herein include features that allow a user to quickly and visually determine the connectivity state of a network device in real time, and in some cases, various other components of the network. The network device can include an identifying code or codes, such as an optical code, RF code, etc. An optical code may include a visible marking that may be detected and correlated to the networking device (e.g., switch); examples of optical codes include, but are not limited to QR codes, alphanumeric codes, symbols, etc. An optical code may correspond to a two-dimensional (2D) pattern code (e.g., matrix bar code) that contains encoded information associated with the network device. The optical code may be displayed on the network device, such as on an exterior surface of the network device, or be otherwise be readily accessible to a user. In some embodiments, the optical code is on a changeable display, such as a touch screen display, that a user can change to access different optical codes or other information.

Alternatively or additionally, the identifying code on the network device may be a radio-based identification code corresponding to the network device. In some examples, the network device may transmit a radio signal, such as a Bluetooth signal or may interact with a mobile device by way of a radio-frequency identification (RFID) code (tag) or near field communication (NFC) code (tag). The radio-based identification may be used in conjunction with, or in place of, the optical code for the identification of a network device. As those skilled in the art may appreciate that a Bluetooth signal may have frequency in the range of 2.402 gigahertz to 2.480 gigahertz; and a radio frequency signal may have frequency in the range of 20 kilohertz to 300 gigahertz.

The identifying code may be uniquely associated with the particular network device. However, in some variations the identifying code may instead be associated with a particular subgroup of networking devices and the unique identity of the device may be determined based on a secondary indicator, such as the identity of the scanning device (e.g., smartphone, tablet, etc.) that may be associated with a particular user. For example, the identifying code may identify a particular category, class or sub-set of networking devices, and the unique identity of a particular device within this category, class, or sub-set of networking devices may be uniquely identified by associated secondary information such as the user identity of the user performing the scan, the scanning device (e.g., smartphone), one or more devices determined to be coupled or connected to the networking device, etc.

An identifying code (e.g., an optical code and/or radio-based identification code) may be used to retrieve real time information associated with a connectivity state of each of the ports of the network device. The identifying code (e.g., optical code and/or radio-based identification code) may also be used to access a library of virtual objects based on the connectivity state of the port and types of devices that are connected to the network. One or more virtual objects can then be combined with (e.g., overlaid on) the captured camera images of the network device to provide a visual representation of the ports, various devices connected to the network, and other information related to the various devices connected to the network.

In some embodiments, the virtual objects include illustrations of the communication ports (virtual ports) that align with corresponding captured images of the ports. For instance, a user may view a port of the network device using a camera of a mobile device and a virtual port can be displayed over at least a portion of the image of the port. The position of the virtual port may automatically and dynamically adjust based on movement of the mobile device. For example, when the user moves the mobile device to capture an image of the network device from a different perspective, the position of the virtual port can automatically adjust to maintain its position over the image of the port such that the user experiences seamless transitions while moving and viewing different parts of the network device. In some embodiments, the position of the virtual object is stabilized by filtering out one or more degrees of freedom used to determine the spatial relationship of the mobile device with respect to the port(s).

The virtual objects may include one or more virtual labels with text, numbers and/or symbols that convey information related to the ports. For example, a virtual label on or proximate to images of a port may include an identification of the port (e.g., port number) and/or identification of a device connected to the port. A virtual label may include a line that extends between text, numbers or symbols and the image of the port indicating a relationship between the virtual label and the port.

The virtual objects may include illustrations of the one or more devices connected, or that was previously connected, to the ports. The illustrations (icons) can provide the user with a quick visual reference as to which devices are associated with which ports. For example, an icon may be an illustration with enough detail for a user to determine whether the icon is a personal computer, printer, router, access point, router, or other device. In some cases, information about the connected device is used to illustrate the specific model or brand of the device. For example, the icon may be an illustration of a specific brand or model of phone, television, laptop computer, headset, desktop computer, access point, media player, or tablet computer.

In some cases, the virtual object has a different appearance depending on the connection state of the ports. For example, the virtual port may have a different color or opaque quality when a device is connected to the port versus when a device is not connected to the port. In some cases, the icon has a different color or opaqueness when the device is connected to a port versus when the device is not connected to the port. For example, the icon may have a grayed-out or ghost appearance when the device is not currently connected but was previously connected to the port within a specified time.

According to some embodiments, the virtual objects may convey information as to whether a device connected to a port of the network device has other devices connected to it. For example, if the network device is connected to a wireless access point, a virtual label and/or illustration may indicate whether the access point device is connected to one or more other devices, such as a phone, laptop, tablet or headset. The virtual objects may also convey performance information of various devices connected to the network device, such as throughput or uptime. The virtual objects may convey such data in the form a virtual graph or chart.

For example, the connectivity information may also or alternatively include port statistics about both the connected and/or unconnected ports on the networking device. For example the virtual display may include information on port statistics for all or some of the connected ports; the user may toggle the display/hide of any (all or a subset) of the port statistics information. Port statistics information may include, for example, throughput information (e.g., current throughput, average throughput for hour, day, week, etc., MAC addresses, IP addresses, etc.). In some variations, port statistics information may include historical information (e.g., showing one or more connections made in the past, when connected/disconnected, etc.). In some variations the port statistics information may be displayed for currently unconnected ports. Port statistics information may be displayed as text, icons, or some combination of both. This information may be displayed by user selection (e.g., selecting from the touchscreen to expand or collapse the additional information). Thus, port connectivity information may be displayed as part of the virtual object, in addition to the virtual object, or separately from the virtual object.

These and other features and advantages of the AR methods, systems and devices are described in detail herein.

Any of the methods described herein may be performed by an apparatus (e.g., system, device, etc.) configured to perform the method, including the optional steps described herein. For example, described herein are systems for displaying a network device with augmented reality using a mobile device. Such a system may include: receiving an identifying code from the network device by the mobile device; displaying captured camera images of the network device on a display of the mobile device, the images including a plurality of ports of the network device; retrieving information associated with a connectivity state of each of the plurality of ports using the identifying code; determining a spatial relationship of the mobile device with respect to the one or more ports using the identifying code; and overlaying one or more virtual ports over the network device on the images, wherein the virtual ports include information about the connectivity of the network device in the one or more virtual ports.

The identifying code may be an optical code (e.g., barcode, QR codes, etc.) or an RF code (e.g., Bluetooth code, NFC, etc.). Any of these methods may include accessing a library of virtual objects based on the information associated with connectivity state of the port, the virtual objects may include one or more icons corresponding to a type of device connected to one or more ports of the network device (e.g., camera, phone, computer, access point, etc.). The virtual ports may include the one or more icons. When displayed, these icons may be used to indicate information about the connected device(s).

For example, a method of displaying a network device with augmented reality using a mobile device may include: displaying captured camera images of the network device on a display of the mobile device, the images including: one or more ports of the network device, and an optical code on the network device that includes network connectivity information associated with the network device; retrieving information associated with a connectivity state of the one or more ports using the optical code; accessing a library of virtual objects based on the information associated with connectivity state of the one or more ports, the virtual objects including an icon corresponding to a type of device connected to each of the one or more ports of the network device; determining a spatial relationship of the mobile device with respect to the one or more ports using the optical code; and overlaying one or more virtual ports, wherein the virtual ports each include the icon corresponding to the type of device connected to the one or more ports, over the image of the network device, wherein a quality of the virtual port indicates the connectivity state of the port based on the retrieving information.

A system for displaying a network device with augmented reality using a mobile device may include one or more processors; memory coupled to the one or more processors, the memory configured to store computer-program instructions, that, when executed by the one or more processors, perform a computer-implemented method comprising: receiving an identifying code from the network device by the mobile device; displaying captured camera images of the network device on a display of the mobile device, the images including a plurality of ports of the network device; retrieving information associated with a connectivity state of each of the plurality of ports using the identifying code; determining a spatial relationship of the mobile device with respect to the one or more ports using the identifying code; and overlaying one or more virtual ports over the network device on the images, wherein the virtual ports include information about the connectivity of the network device in the one or more virtual ports.

The one or more processors may be part of a mobile device (e.g., smartphone, tablet, etc.).

Any of these methods and the devices for performing them may be configured to operate in real time, or near-real-time.

For example, a method of displaying a network device with augmented reality using a mobile device, the method comprising: capturing a video image of a network device using a mobile telecommunications device, wherein the video image includes a plurality of ports; receiving, in the mobile telecommunications device, an identifying code specific to the network device from the network device; determining, from the identifying code, information about the connectivity of the plurality of ports of the network device; displaying on the video image, in real time, an overlay onto the plurality of ports of the network device, the overlay including an indicator of network connectivity specific to each port, wherein the indicator of network connectivity comprises one or more of: connection status, connection rate, data traffic, connection identity, duration of connection, and power over Ethernet (POE) usage.

A method of displaying a network device with augmented reality using a mobile device, may include: capturing a video image of a network device using a mobile telecommunications device, wherein the video image includes a code specific to the network device; determining, from the code, information about the connectivity of one or more ports of the network device; displaying on the video image in real time, an overlay onto the one or more ports of the network device including an indicator of network connectivity specific to each port, wherein the indicator of network connectivity comprises one or more of: connection status, connection rate, data traffic, connection identity, duration of connection, and power over Ethernet (POE) usage.

The network device may be any appropriate network device having one or more ports, such as e.g., a switch, a router, an access point, etc. The mobile telecommunications device may comprise a smartphone or tablet. The code may comprise a QR code, such as a digital QR code. The digital QR code may be updated or modified to optically transmit information to the handheld device (e.g., smartphone, tablet, etc.).

Any of these methods may include determining the locations of each of the one or more ports of the network device from the code and the image. For example, any of these methods may include determining the locations of each of the one or more ports of the network device from the code and the image and an orientation of the mobile telecommunications device.

Determining may comprises determining information about the connectivity of one or more ports of the network device by accessing a remote database using the mobile telecommunications device and using the code to identify information regarding the one or more ports. In any of these methods, the one or more ports may each be uniquely identified.

A method of displaying a network device with augmented reality using a mobile device, may include: capturing a video image of a plurality of network devices using a mobile telecommunications device, wherein each of the network devices comprises a plurality of ports and a unique identifier code; receiving, in the mobile telecommunications device, the unique identifying code specific to each of the network devices from the network devices of the plurality of network devices; determining, from the unique identifying code specific to each of the network devices, information about the connectivity of one or more ports of each of the network devices; displaying on the video image in real time, an overlay onto each of the one or more ports of the network devices including an indicator of network connectivity specific to each port, wherein the indicator of network connectivity comprises one or more of: connection status, connection rate, data traffic, connection identity, duration of connection, and power over Ethernet (POE) usage; and updating the display in real time as the indicator of network connectivity changes.

For example, a method of displaying a network device with augmented reality using a mobile device may include: capturing a video image of a plurality of network devices using a mobile telecommunications device, wherein the video image includes a digital QR code specific to each of the network devices in the plurality of network device; determining, from the digital QR codes, information about the connectivity of one or more ports of each of the network devices; displaying on the video image in real time, an overlay onto each of the one or more ports of the network devices including an indicator of network connectivity specific to each port, wherein the indicator of network connectivity comprises one or more of: connection status, connection rate, data traffic, connection identity, duration of connection, and power over Ethernet (POE) usage; and updating the display in real time as the indicator of network connectivity changes.

Also described herein are systems for displaying a network device with augmented reality using a mobile device. For example, a system may include: one or more processors; memory coupled to the one or more processors, the memory configured to store computer-program instructions, that, when executed by the one or more processors, perform a computer-implemented method comprising: capturing a video image of a network device using a mobile telecommunications device, wherein the video image includes a plurality of ports; receiving, in the mobile telecommunications device, an identifying code specific to the network device from the network device; determining, from the identifying code, information about the connectivity of the plurality of ports of the network device; displaying on the video image, in real time, an overlay onto the plurality of ports of the network device, the overlay including an indicator of network connectivity specific to each port, wherein the indicator of network connectivity comprises one or more of: connection status, connection rate, data traffic, connection identity, duration of connection, and power over Ethernet (POE) usage.

A system for displaying a network device with augmented reality using a mobile device may include: one or more processors; memory coupled to the one or more processors, the memory configured to store computer-program instructions, that, when executed by the one or more processors, perform a computer-implemented method comprising: capturing a video image of a plurality of network devices using a mobile telecommunications device, wherein each of the network devices comprises a plurality of ports and a unique identifier code; receiving, in the mobile telecommunications device, the unique identifying code specific to each of the network devices from the network devices of the plurality of network devices; determining, from the unique identifying code specific to each of the network devices, information about the connectivity of one or more ports of each of the network devices; displaying on the video image in real time, an overlay onto each of the one or more ports of the network devices including an indicator of network connectivity specific to each port, wherein the indicator of network connectivity comprises one or more of: connection status, connection rate, data traffic, connection identity, duration of connection, and power over Ethernet (POE) usage; and updating the display in real time as the indicator of network connectivity changes.

The methods and apparatuses described herein may be configured to be used with multiple network devices (e.g., multiple switches, routers, etc.) that each include a plurality of ports. For example, in some variations the method may include receiving an identifying code (e.g., a unique identifying code) for each of a plurality of networking devices, such as a stack of devices. The identifying codes may be all optical, all RF, or a combination of optical and RF codes. These methods and apparatuses may allow the user to toggle between displays of virtual ports for each of the plurality of devices. For example, a user may move the mobile telecommunications device up/down a stack of network devices to change the view showing the virtual ports corresponding to each; alternatively or additionally, the user's may select a control on the mobile telecommunications device to switch the augmented reality view between different network devices. In some variations, multiple different network devices may be simultaneously shown together.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 1A and 1B illustrate an example of a user using the devices and methods described herein.

FIGS. 4A-4F illustrate example user interfaces for setting up and using a mobile device in AR mode.

FIGS. 9A-9E illustrate aspects of an example 3D coordinate systems used to render the AR objects.

FIGS. 10A-10D illustrate a flowchart and architecture map representing an example process for setting up and using an AR application.

DETAILED DESCRIPTION

Figure 2A:
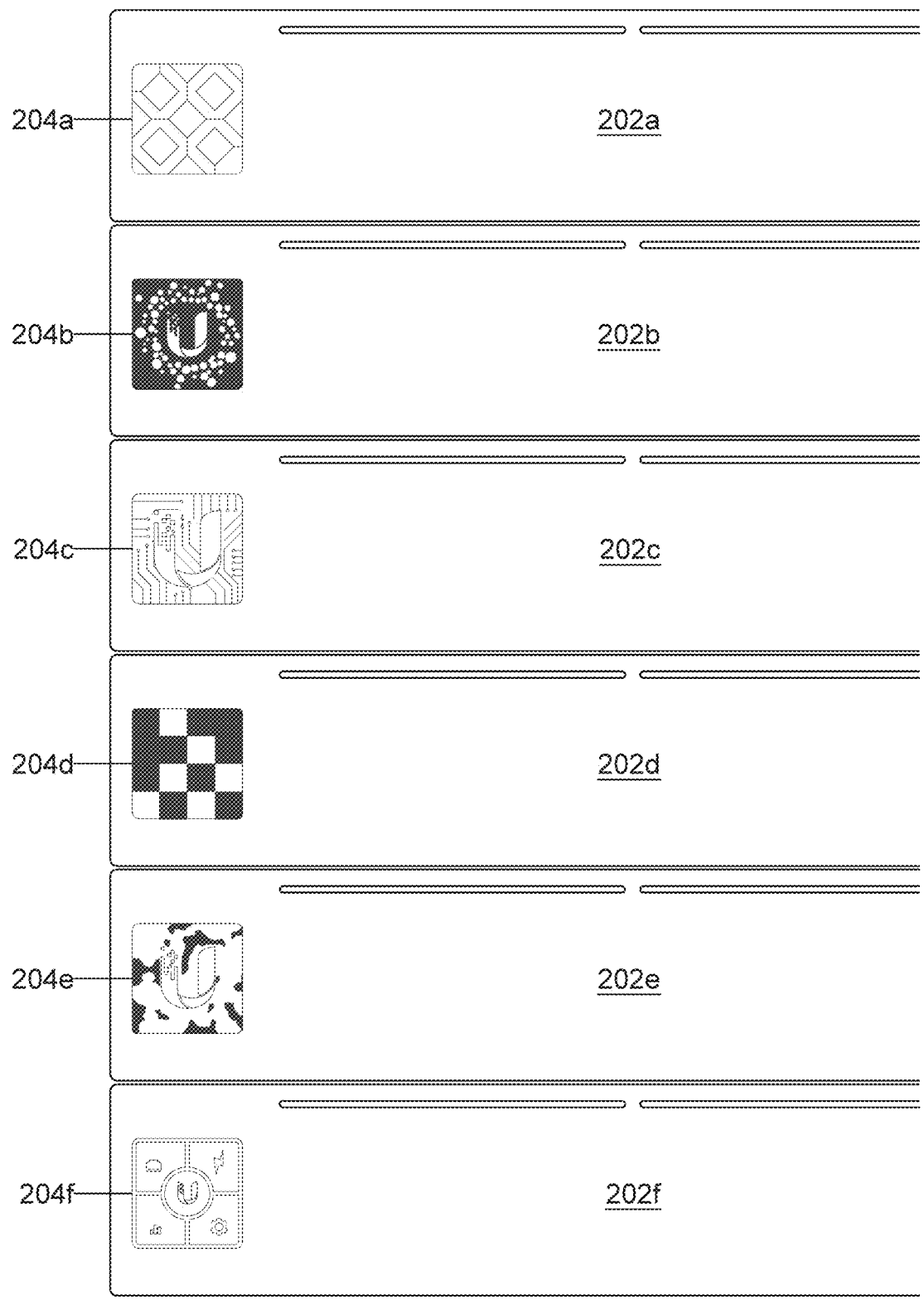
FIG. 2A illustrates an example of a stack of network devices having optical codes.

In general, described herein are augmented reality (AR) systems, devices and methods for viewing hidden features of electronic devices. In particular applications, the AR systems, devices and methods are used to render virtual objects that convey information related to network connectivity of the electronic devices. The virtual objects may provide a visual representation to a user regarding the network connectivity state of a network device, thereby facilitating the installation and management of a computer network. The user may use a camera of a mobile device, such as a mobile phone or tablet computer, to capture a stream of images of the network device in real time. Virtual objects can be rendered on the display of the mobile device along with the captured images to provide an augmented reality experience for the user.

FIGS. 1A and 1B illustrate one example of a user 101 using the AR devices and methods described herein. The user 101 may be any person, such as tech support personnel or IT administrator that installs or manages a workplace network, or a personal consumer that installs or manage a home network. The user 101 may use a mobile device 100 to visually observe hidden aspects related to a network device 102, and be used to install, troubleshoot and/or check the status of the network device 102.

In general, the network device 102 may be any electronic device that is capable of connecting, wired and/or wirelessly, to one or more computer networks. The computer network can include one or more networks ranging in size anywhere from a wide area computer networks to a nanoscale computer network. The computer network may be a local network, a wide area network such as a cloud-based network (e.g., the internet), or a combination of local and wide area networks. For example, the computer network may be a local computer network that interconnects computers of a business, residence, or school, which may also be connected to the internet. In some cases, the network device 102 is configured to mediate data transmission in one or more computer networks. The network device 102 may be a network switch (also referred to as a switching hub) that connects devices on a computer network using packet switching to receive, process, and forward data to a destination device. The network device 102 may be a gateway device that allows data flow among different networks. The network device 102 may be a router that forwards data packets among computers. The network device 102 may be a digital hub that receives information from various sensors and controllers (nodes) that may form a 'smart' wirelessly connected habitable space (e.g., home, office, work, etc.) network. The network device 102 may be a network bridge that creates an aggregate network from multiple communication networks or network segments. The network device 102 may be a repeater that receives and retransmits signals. The network device 102 may be an Ethernet hub for connecting multiple Ethernet devices together. The network device 102 may be a hybrid network device, such as a multilayer switch, protocol converter and/or a bridge router (brouter). In some embodiments, the network device is a UniFi Dream Machine Pro (UDMP) or other network device manufactured by Ubiquiti Networks, based in New York, N.Y., U.S.A. The network device 102 may be a border network device that resides on the connections point of different networks, such as a proxy server, firewall, or network address translator (NAT). The network device 102 may be an end station device used to establish networks or dial up connections, such as a network interface controller (NIC), wireless network interface controller, modem, ISDN terminal adapter or line driver. The network device 102 may be a server that provides functionality for one or more clients. The network device 102 may be one of several network devices arranged in a stack 110 of network devices, in this case within a rack.

The devices and methods described herein employ virtual objects so that the user 101 can see hidden aspects of the network device 102, or for a number of network devices in the stack 110. To initiate the AR tools, the user 101 may use a scanning device, such as mobile device 100, to scan an optical code 104 on the network device 102, as shown in FIG. 1A. For example, the user may use a camera of the mobile device 100 to capture one or more images of the optical code 104. The optical code 104 can be any machine-readable code that contains information about the network device 102. The optical code 104 may be a two-dimensional (2D) pattern that encodes information associated with network device 102. For example, the optical code 104 may be a Quick Response (QR) code, an ARTag code, barcode (e.g., linear barcode), an alphanumeric code, number code, written letters, or any combination thereof. The optical code 104 may be on a surface of the network device 102, such as an exterior surface that is easily accessible to the user 101. The optical code 104 may be attached to the surface using any means. For example, the optical code 104 may be painted on a surface of the network device or on a sticker adhered to the surface of the network device. In some cases, the optical code 104 is generated by a display on the network device 102.

The optical code 104 may include one or more identifiers (e.g., unique identifier) associated with the network device 102 so that information associated with the network device 102 may be accessed. For example, when the user captures one or more images of the optical code 104, the mobile device 100 may send the identifier(s) to a network management system (e.g., one or more remote servers). Upon receiving the identifier(s) from the mobile device 100, the network management system may send the mobile device 100 and/or the network device 102 information about the network device 102. For example, the mobile device 100 may have access a database of information related to the network device 102. The database can include a library of virtual objects based on the identity of the network device 102, the connectivity state of the network device 102, and the identity of any devices connected to the network device 102. The information can include the type (e.g., make and model) of the network device 102 as well as information regarding one or more communication interfaces, such hardware or software interfaces. The information may include information related to one or more communication ports 108, of the network device 102. The port 108 may be any type of interface between the device and other computers or peripheral devices. The port 108 may be an input or output interface for the device. The port 108 may include a hardware interface including, but not limited to, a Universal Serial Bus (USB) port, serial port, video port, audio port, High Definition Multimedia Interface (HDMI) port, or parallel port. In some cases, the communication interface is a wireless interface that wirelessly connects to one or more computers.

Once the mobile device 100 receives the information associated with the network device 102, this information can be used to render virtual objects on the display of the mobile device 100 along with the captured camera images in real time. In some embodiments, the virtual objects overlay the captured camera images. The virtual objects may include illustrations and/or text that convey information which is normally not readily apparent the user 101. The virtual objects may include virtual ports 108, cables 106, or other illustrations of parts of the network device 102. The virtual objects may include text, numbers and labels that convey information as to the identity and/or status of any devices connected to the network device 102 via the ports 108 and/or via wireless communication.

The virtual objects may include icons corresponding to illustrations of various devices connected to the network device 102. In some cases, the icons may be displayed adjacent to the captured images of the ports 108 so that the user 101 can quickly identify the type and connectivity of the various devices. The icons can depict any type of device connected to the network, such as a computer or other device (e.g., sensor). For example, the computer may be a personal computer, such as a desktop computer or a mobile device (e.g., laptop, tablet, phone or headset). The computer may be a server computer configured to be shared by one or more users of a network. The computer may be a server or a client. The computer may be a router, such as a wireless router. The computer may be a modem. The computer may be a printer or other office setting computer device. The computer can be an access point device configured to allow Wi-Fi devices to connect to a network. The computer may be a smart home device, such as a thermostat, smoke or carbon monoxide detector, security system, doorbell, smart lock, kitchen appliance. The computer can be a camera, speaker or microphone device. The computer may be a Bluetooth device.

In some embodiments, the mobile device 100 can dynamically display the virtual objects in real time. That is, the virtual objects may be rendered on the display of the mobile device 100 during, or sufficiently close to, the time in which the images captured by the camera of the mobile device are rendered on the display such that the user may experience a substantially continuous progression of images, much like a video with virtual objects incorporated therein. As the camera of the mobile device 100 captures a stream of images over time, the virtual objects can be rendered on the display along with the stream of images. Thus, when the user 101 moves the mobile device 100 relative to the network device 102, such as when scanning the various ports 108 of the network device 102, the virtual objects may dynamically update themselves based on the progression of captured images. For example, the virtual objects may maintain their positions on the display relative to corresponding ports 108 as the mobile device 100 is moved. This spatial ability can be enabled using a spatial coordinate system, which can depend on one or more motion sensors of the mobile device 100 for detecting movement of the mobile device 100. For example, the mobile device 100 may include a motion sensing system that may include an accelerometer and/or a gyroscope.

The virtual object(s) may update information as to the connectivity state of the various ports 108 in real time. This way, the user 101 may use the information provided by the virtual objects to troubleshoot the network device 102, for example, by connecting and disconnecting one or more cables 106 from the ports 108, or by turning various devices connected to the network device 102 on and off. In some embodiments where data is transmitted in network packets (e.g., packet switching), the virtual objects may allow the user 101 to perform a feed packet inspection for security controls. The user 101 can also check the connectivity status of each of the ports 108 in real time to determine, for example, whether the network device 102 is properly connected to various devices in the network. The virtual objects may convey information regarding the status of the various devices in the network, including secondary, tertiary, etc. devices which are connected to those devices. Other network devices 102 within the stack 110 may similarly be viewable with AR such that the user 101 can scan all the network devices in the stack 110. In this way, the AR tools described herein can allow the user 101 to quickly and easily determine the status of the entire network system, including subsystems of the network.

Figure 2B:
FIG. 2B illustrates an example display screen for displaying one or more optical codes.

FIG. 2A shows an example of network devices 202a-202f having different optical codes 204a-204f that encode information related to the corresponding network devices 202a-202f. As shown, the optical codes 204a-204f can have any of a number of different patterns. For example, the optical codes 204a-204f may be a Quick Response (QR) code, an ARTag code, barcode (e.g., linear barcode), an alphanumeric code, a number code, written letters, or any combination thereof. The different patterns can encode different types of information based on the identification and state of the corresponding network device. In some cases, the optical codes 204a-204f are displayed on displays (e.g., flat panel displays) of the network devices 202a-202f. FIG. 2B illustrates an example of a display component that can be configured to display one or more optical codes. The displays can be of any type, such as liquid crystal displays (LCD) and/or light-emitting diode (LED) displays (e.g., organic light-emitting diode (OLED) displays). In some embodiments, the displays are touch screen displays that are capable of displaying different images based on touch input. For example, the touch screen displays may be configured to change what is displayed in response to a user swiping the touch screen.

In some cases, the network device(s) may not have an LCD or other type of visually active screen, but may instead use a static optical code (e.g., such as a sticker or other printed identifier) associated with the networking device.

As mentioned above, the identifying code may be a radio frequency (e.g., RF) identifying code, such as a radio-based ID (e.g., Bluetooth, NFC, RFID) code that may be used by the handheld device to identify (e.g., uniquely identify) the network device. The RF identifying code may be dynamic (similar to the optical code on a screen) or it may be static (e.g., as a printed optical code attached to the outside of the networking device).

Figure 3A:
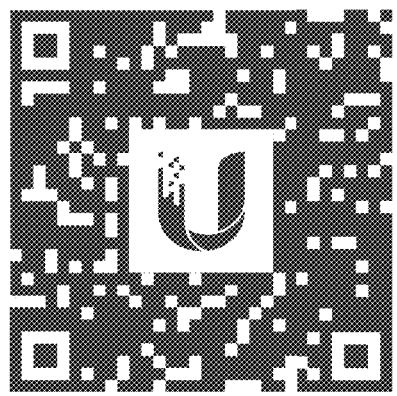
FIGS. 3A-3C illustrate examples of optical codes generated using a code generator.
Figure 3B:
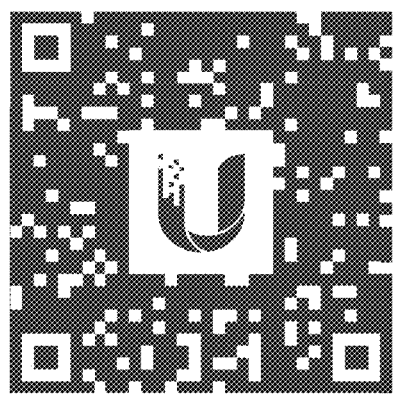
Figure 3C:
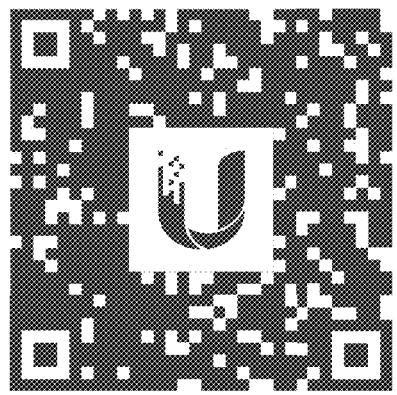

FIGS. 3A-3C show examples of three different optical codes that include different code patterns. These examples illustrate how different patterns can encode unique information based on the network device, including the connectivity state of the network device. The information from the optical codes can then be sent to, for example, a cloud-based management system, that sends the mobile device and/or network device information associated with the network device and that is used to generate the virtual objects. In some examples, the optical codes are generated using a pattern generator program that (e.g., randomly) generates patterns to provide unique optical codes.

Figure 4A:
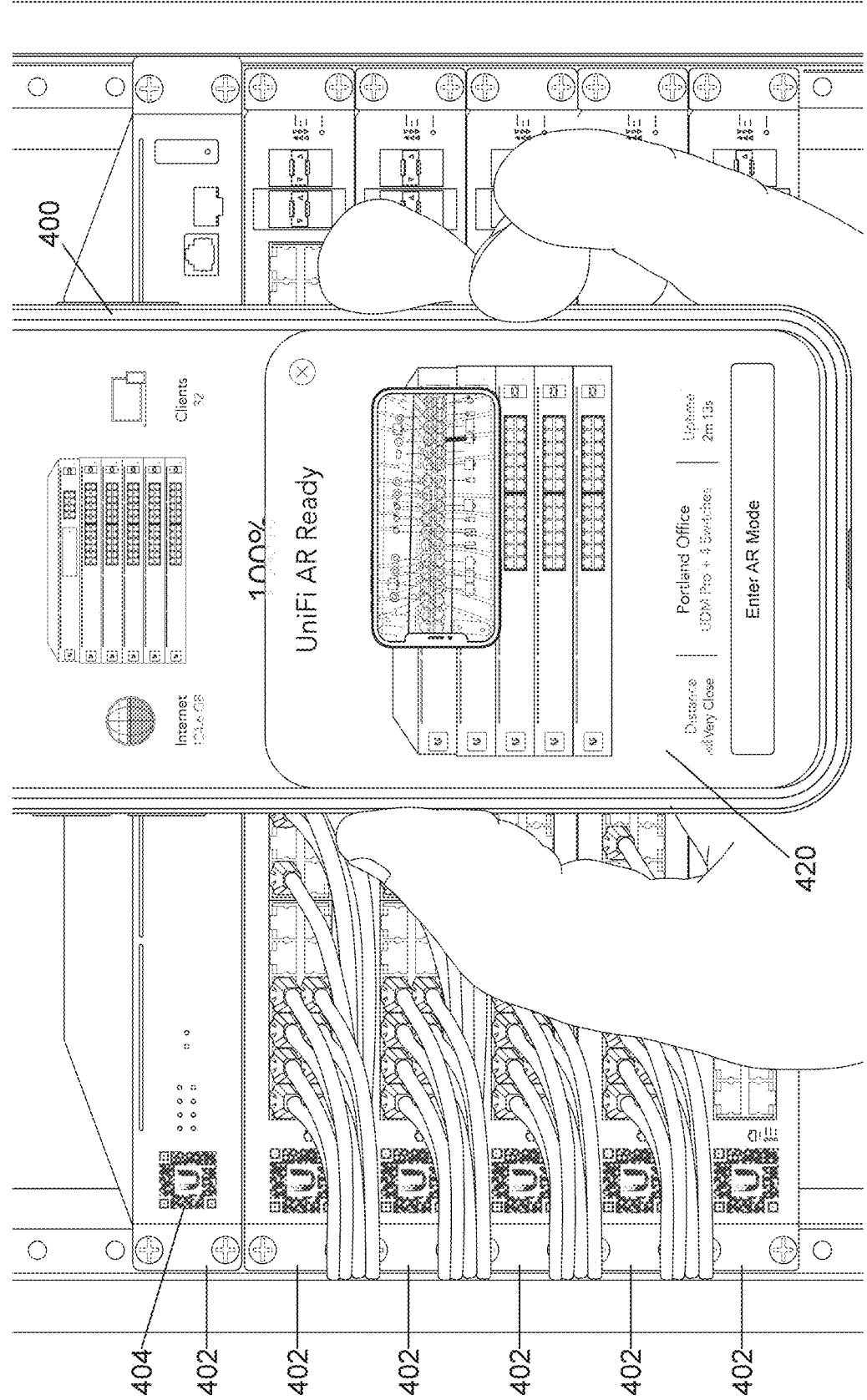

FIGS. 4A-4F illustrate examples of user interfaces for setting up and using a mobile device 400 in AR mode, according to some embodiments. FIG. 4A shows the user using a camera of the mobile device 400 to view multiple network devices 402, each having a corresponding optical code (e.g., 404). The mobile device 400 may be considered an example of the mobile device 100. The user interface 420 may be displayed on a display screen of the mobile device and guide the user through a number of interface screens for the initial setup for the mobile device 400 to enter into AR mode. The user interface 420 may include a geographical location of the network devices, the types (e.g., make and model) of the network devices and/or illustrations of the network devices. The user interface 420 may video images of the network devices 402 captured on a camera of the mobile device 400. The user interface 420 may include a button for entering an AR mode.

FIG. 4B1 and FIG. 4B2 illustrates two views of an example user interface 421 prior to scanning of an optical code of a network device. The user interface 421 may prompt the user to scan each of the network devices so that information regarding each of the network devices can be accessed and loaded for use in the AR mode. The user interface 421 may include an optical code alignment frame 422 for aligning captured images of the optical code (e.g., 404) of each network device.

FIGS. 4C1-4C4 illustrates four views of an example user interface 422 during scanning of optical codes of multiple network devices of the stack ("rack"). After scanning a first optical code of a first network device, the user interface can prompt the user to scan a second optical code of a second network device. A visual indicator, such as presenting the optical code alignment frame 422 in a different color or hue, may be used to indicate locking of an optical code within the optical code alignment frame. Alternatively or additionally, a different visual indicator, such as a check mark symbol 427, may become visible to show that the optical code was successfully scanned. In some embodiments, a tactile and/or audible indicator, such as vibration and/or sound generated by the mobile device, can be used to indicate successful locking and/or scanning of the optical code. The user interface may include a list 424 or table of the network devices, which is progressively updated as each of the optical codes of the network devices is successfully scanned. For example, an icon 425 depicting the corresponding network device can populate the list 424 after the optical code for the network device is successfully scanned and/or recognized (e.g., by a network management system). The list 424 can subsequently be populated with an additional icon 426 after the optical code for the additional network device is successfully scanned and/or recognized (e.g., by a network management system). This scanning of different optical codes for different network devices may continue until, for example, all network devices in a stack are scanned.

FIGS. 4D1-4D4 illustrates four views of an example user interface 430 showing how the AR settings may be applied after the optical codes of the network devices have been successfully scanned. In one view, the user interface 430 may show a list 432 of the scanned network devices that were added, with a prompt 433 (e.g., button) for the user to answer whether more network devices are to be scanned. The user interface 430 can provide a prompt 434 (e.g., button) for the user to proceed to the next view of the user interface. After all the desired network devices have been scanned, the user interface may provide a prompt 435 (e.g., button) for the user to optionally enter a name for the stack (e.g., "rack") of network devices and provide a prompt 436 (e.g., button) for the user to proceed to the next user interface view. Any of the views of the user interface 430 may include a back prompt 438 for returning back to a pervious view. The AR settings for the network devices may then be applied to the network stack based on information received by the optical codes and information provided by the user. After the settings have been applied and complete, the full AR experience may be loaded at this point so that the mobile device can utilize the camera in AR mode on the newly created stack of network devices.

Figure 4E:
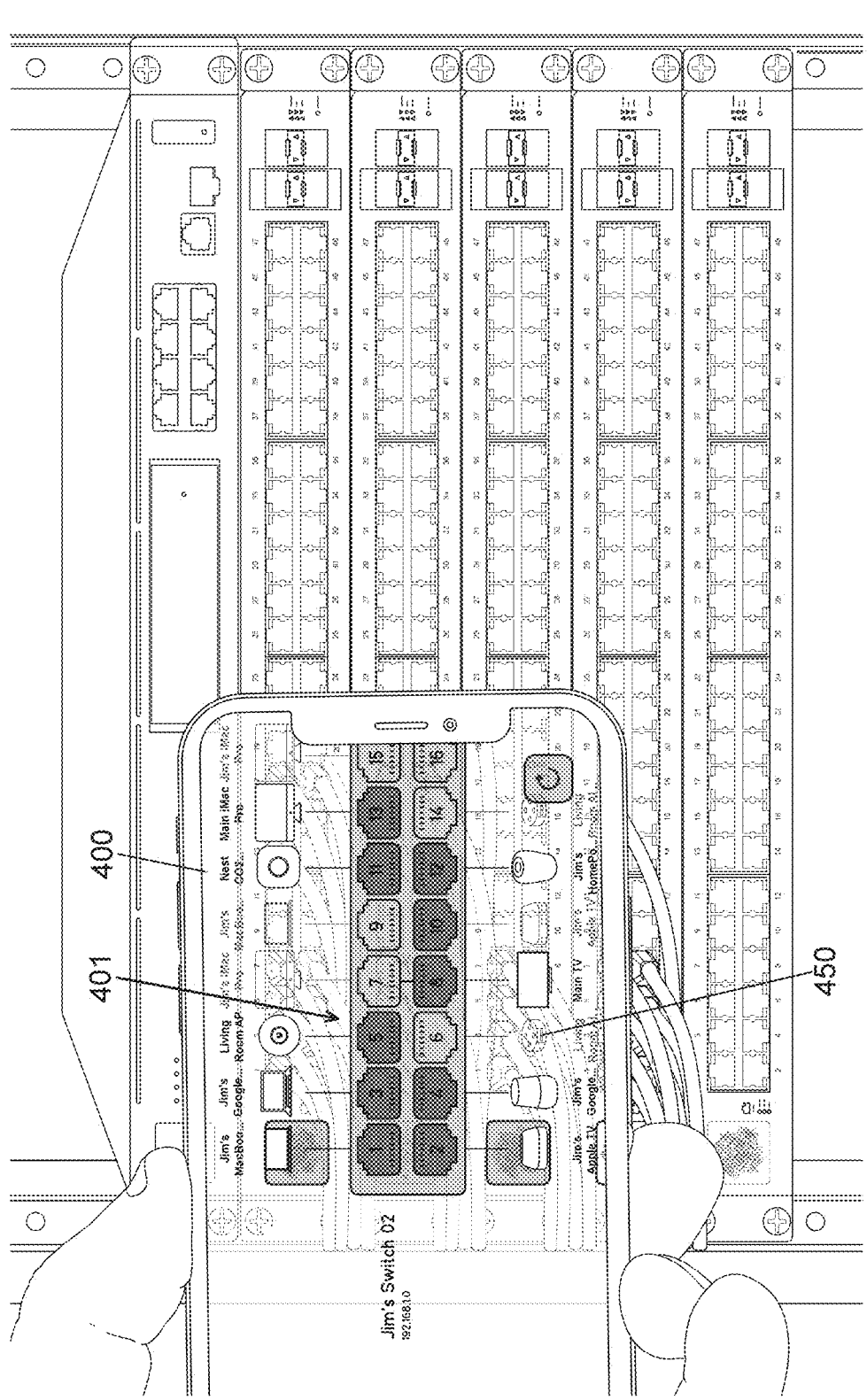

FIG. 4E shows an example of the mobile device once entered into AR mode. As shown, the display of the mobile device 400 can display a user interface 450 that can include one or more virtual objects 401 that overlay captured images of the network devices, and which can convey information related to the network device that is normally hidden from the user.

Figure 4F:
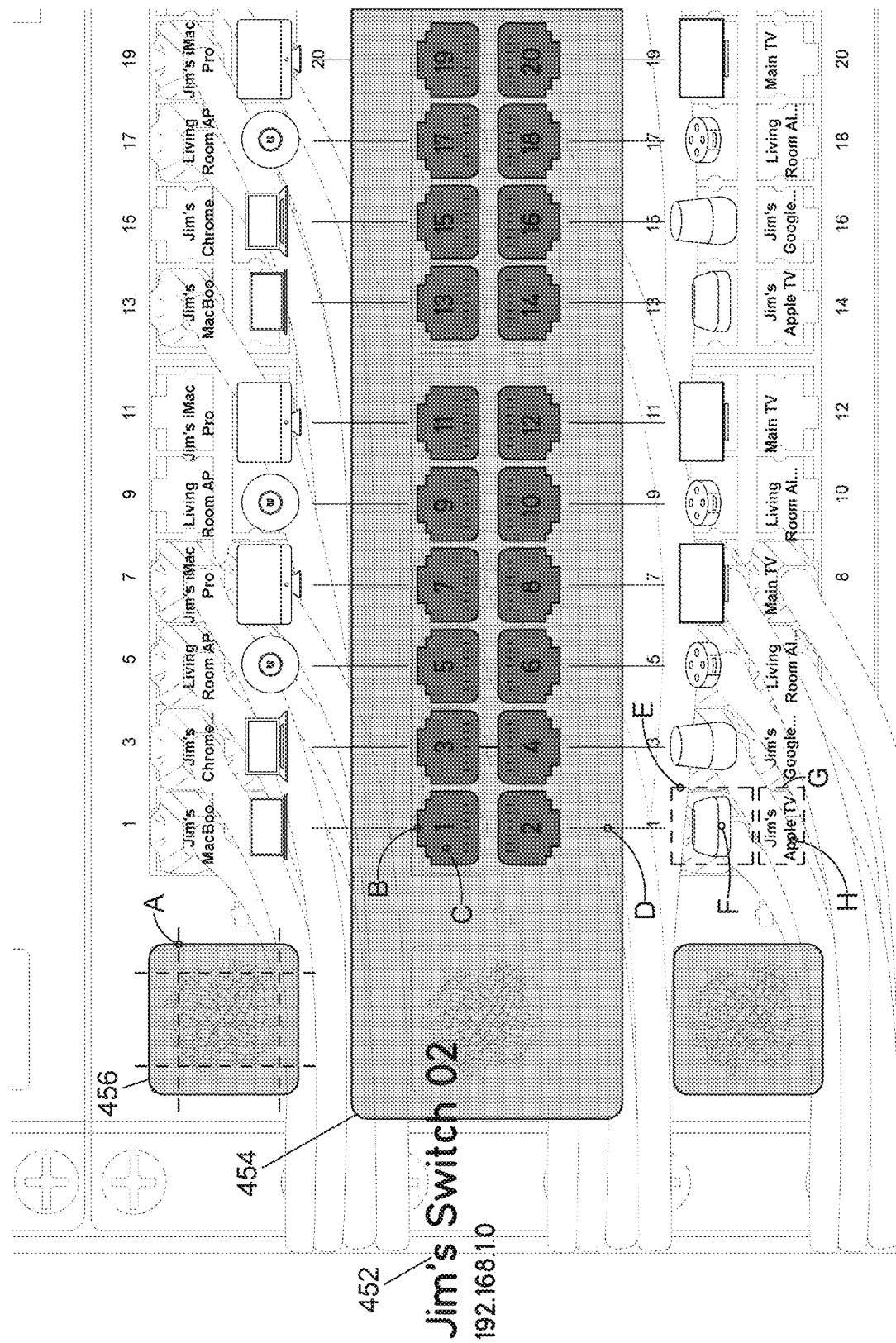

FIG. 4F shows a close-up view of the user interface 450 in AR mode according to some embodiments. The virtual objects may include text (e.g., numbers, letters and/or symbols) and/or illustrations. For example, virtual identifying text 452 of a network device, such as the name and/or internet protocol (IP) address of the network device may be positioned adjacent to or over (e.g., partially over) the image of the network device. The virtual objects may include a port region 454 that at least partially frames various virtual objects related to a particular network device. The virtual objects can include an optical code alignment frame 456 for aligning captured images of an optical code. The optical code alignment frame 456 may be used to assist the user to align the optical code within a lock region A of the optical code alignment frame 456 for locking the optical code. The lock region A may be in a central region of the optical code alignment frame 456. In some embodiments, the port region 454 and/or optical code alignment frame 456 can have a transparent or translucent quality that allows the underlying image of the network device to be visible. In some cases, virtual ports B overlay corresponding ports of the network device. The virtual ports B may have the shape and size of the corresponding physical ports. The virtual ports B may include numbers that correspond to the port numbers as identified, for example, by the manufacturer of the network device. The virtual ports B may be filled in with a color C and/or be at least partially transparent to allow the underlying image of the network device to be visible. In some instances, the color and/or translucent quality may vary depending on the state of the corresponding port. For example, the virtual ports B that are actively connected to a computer can be filled with a first (e.g., darker) color and/or translucent quality while virtual ports B that are not actively connected to a computer can be hollow (i.e., clear) or filled with a second (e.g., lighter) color and/or translucent quality.

The virtual objects may include icons F (also referred as virtual devices or virtual computers) matching the devices that are connected to corresponding ports. The icons F may be illustrations having sufficient detail such that the user can identify the device type (e.g., phone, tablet, laptop, desktop, television, access point, virtual assistant device, home appliance, or security system device), and so that the user can easily and quickly distinguish different types of computers from each other. The icons F may be chosen from a database (also referred to as a library) of virtual object illustrations that are either automatically assigned or chosen by the user. The relative position of the icons F of the computer may be contained within an icon region E.

The virtual objects may include a virtual device identification text H that describes the identity of the computer. The virtual device identification text H may include information to help further identify the device that is connected to, or previously connected to, a corresponding port. For instance, the name of the user and/or the make and model of the device may be identified in the virtual device identification text H. The virtual device identification text H may be automatically populated based on information provided, for example, by the cloud-based network management system, or be chosen by the user. The relative position of the virtual device identification text H may be contained within a device identification text region G.

In some embodiments, the icon F and/or the virtual device identification text H may have different qualities based on whether the device is actively connected to the corresponding port. For instance, the icon F and/or the virtual device identification text H may have a fully colored or opaque appearance when the device is actively connected to the port, have a ghost or grayed-out appearance when the device is not currently connected but was previously connected to the port within a prescribed period of time, and be absent (i.e., regions E and G have no illustration or text) when a device need not be connected to the port within the prescribed period of time. The prescribed time period may vary.

For example, the prescribed time period may be no more than about 30 minutes, 1 hour, 2 hours, 3 hours, 6 hours, 12 hours, 24 hours, 3 days or 1 week. In some embodiments, the prescribed time period may be chosen by the user. In some cases, the icon F and/or the virtual device identification text H includes information as to the operating status of the device. The operating status can include performance characteristics (e.g., real time or historical) of the device.

In some cases, the icon F and/or the virtual device identification text H may include an indication as to whether the device is connected to another device (e.g., secondary, tertiary, etc. device). For example, an access point device may be operationally connected to one or more phones, tablets, laptops and/or headsets. The icon F may have a different appearance, such as be presented in different color, be surrounded by a halo or shadow, or given some other attribute that indicates connectivity to one or more additional devices. Alternatively or additionally, the virtual device identification text H may include text that indicates connectivity to one or more additional devices. In some cases, the icon F and/or the virtual device identification text H includes information as to the operating status of the one or more additional devices.

Aspects of the user interface may vary depending on, for example, the display dimensions, form factor and/or operating system of the mobile device. For example, mobile phones may have a narrower height or width compared to tablet computers. The user interface may be adapted to accommodate these differences.

Figure 5A:
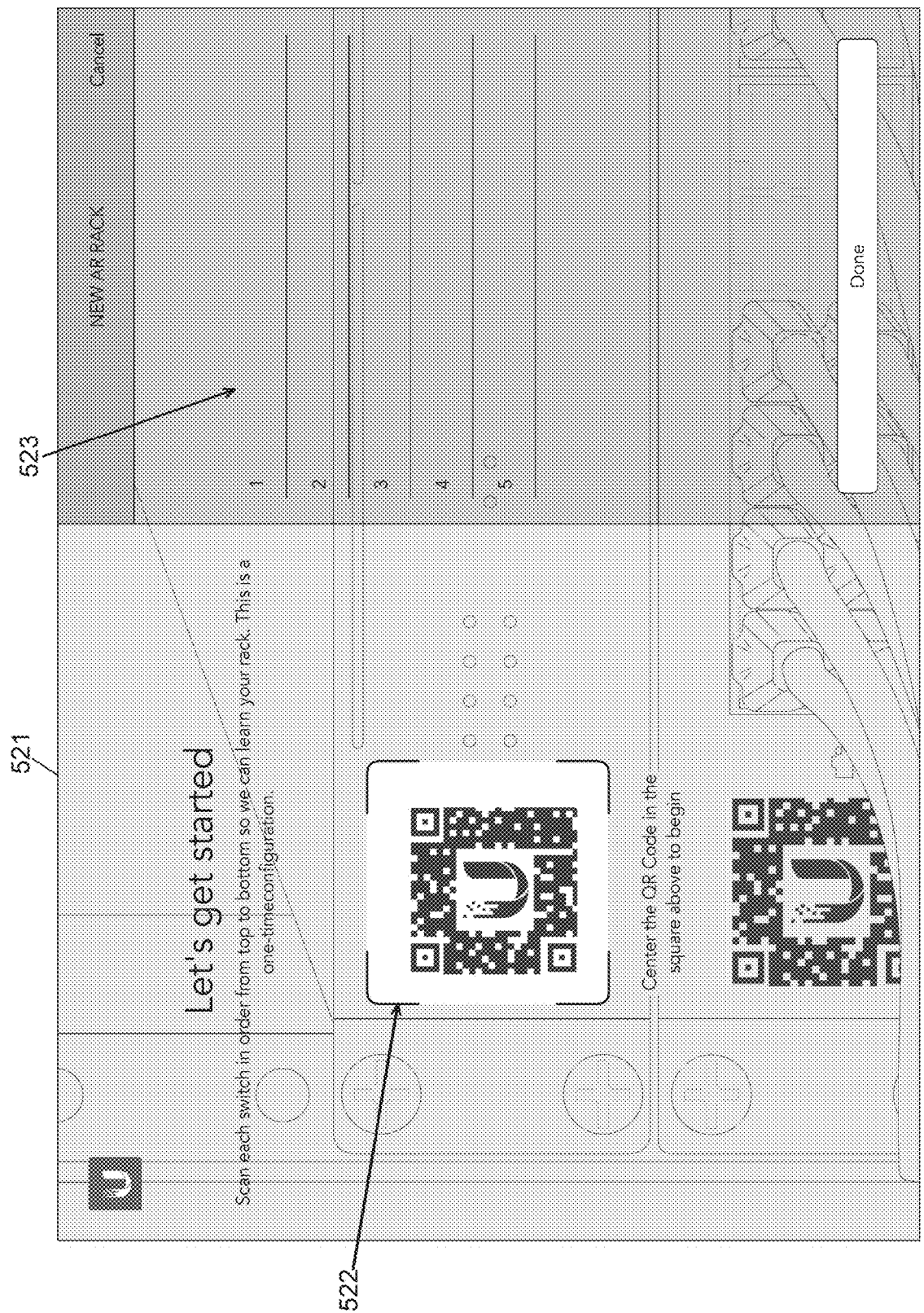
FIGS. 5A-5C illustrate other example user interfaces for setting up a mobile device in AR mode.
Figure 5B:
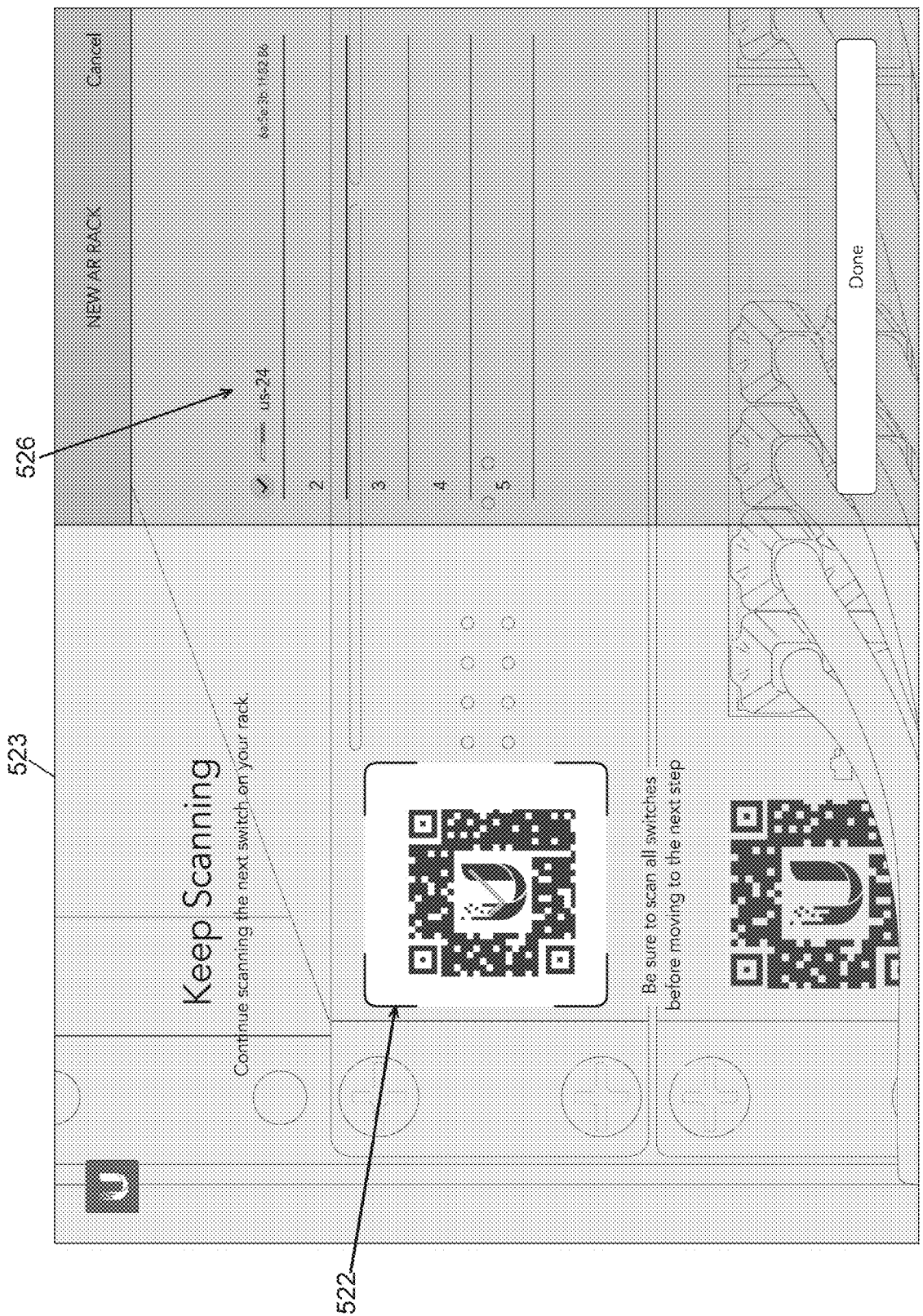
Figure 5C:
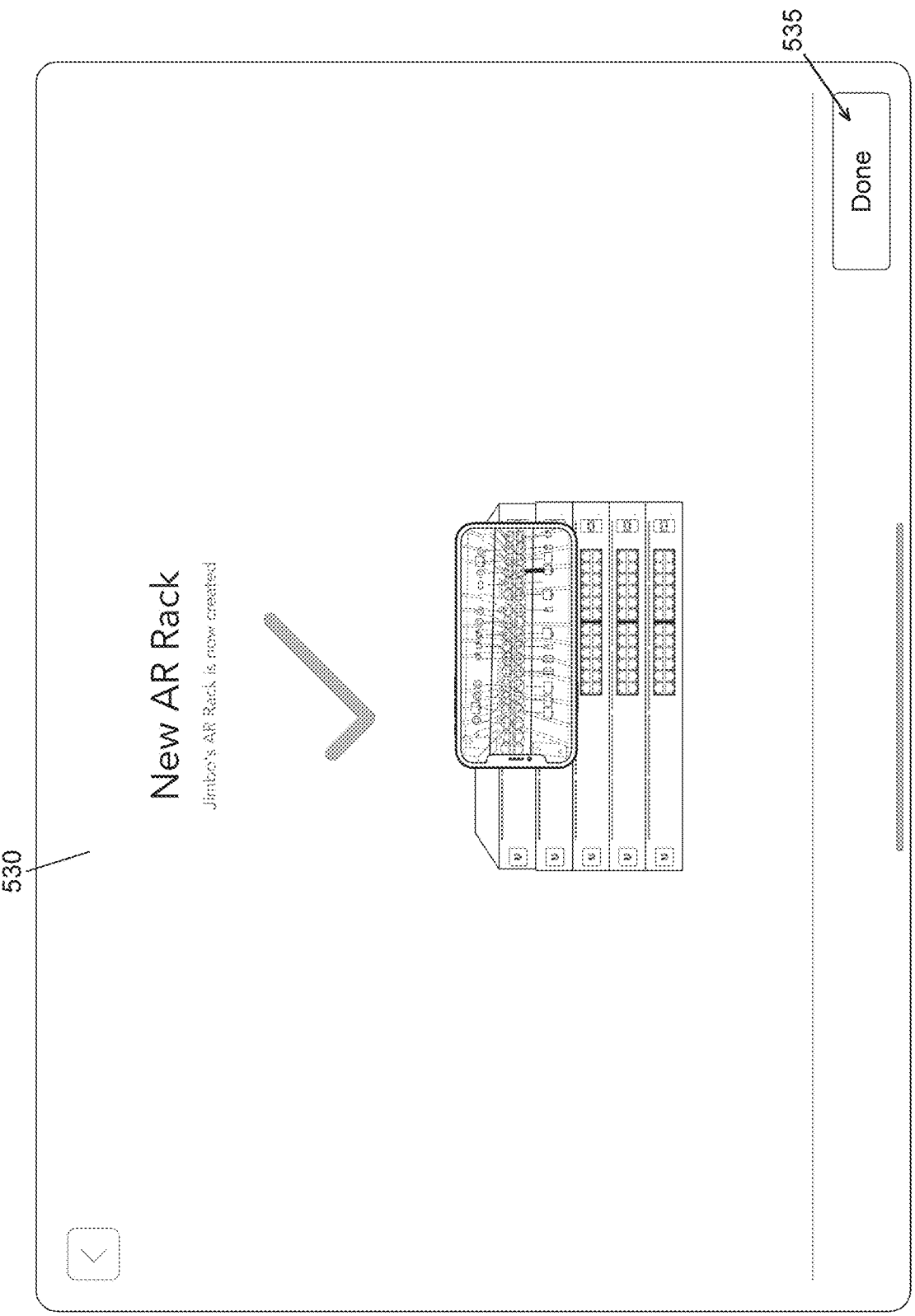

FIGS. 5A-5C illustrate other example user interfaces for setting up a mobile device in AR mode. FIG. 5A illustrates a user interface 521 prior to scanning of an optical code similar to the user interface 421 (FIGS. 4B1-4B2) except that the user interface 521 includes a list 523 that can be populated network devices and that is laterally positioned with respect to the optical code alignment frame 522. FIG. 5B illustrates a user interface 523 during scanning of an optical code similar to the user interface 423 (FIGS. 4C1-4C4) except that the user interface 523 includes a list 526 that can be populated network devices and that is laterally positioned with respect to the optical code alignment frame 522. FIG. 5C illustrates a user interface 530 for applying AR settings similar to the user interface 430 (FIGS. 4D1-4D4) except that a prompt 535 (e.g., button) for the user to choose to complete the AR settings is presented at a bottom side (e.g., right side) of the user interface 530.

Figure 6:
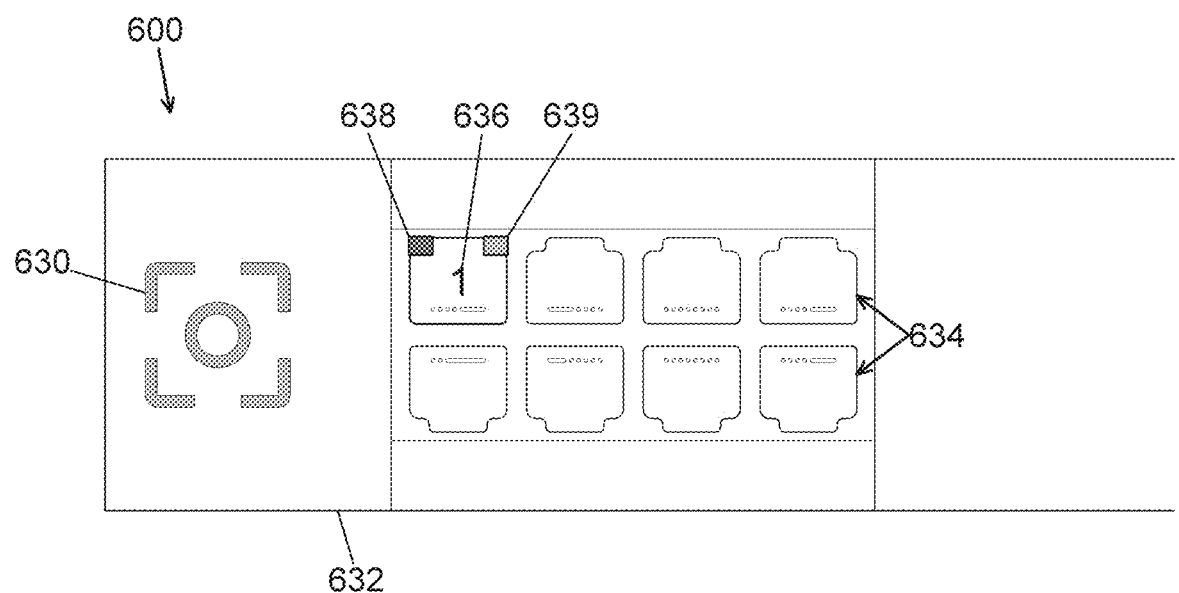
FIG. 6 illustrates an example of an AR overlay for use in conjunction with captured images for viewing a network device.

As described herein, the optical codes can include encoded information that provides access to a library of virtual objects. The optical codes may act as fiduciary markers to inform the appearance and placement of the virtual objects. The relative positions of the virtual objects may be arranged in an overlay that overlays the images captured, for example, by the camera of the mobile device. FIG. 6 illustrates an example of an overlay 600 according to some embodiments. At least a portion of the overlay 600 may be substantially transparent such that the underlying images may be viewed when rendered on a display of the mobile device. An optical code alignment frame 630 can define a region of the overlay 600 that is configured to scan and receive the image of the optical code. In some cases, the optical code alignment frame 630 may outlined with a border or frame, and/or have a central marker (e.g., circle). In other cases, the optical code alignment frame 630 may have no border or frame.

Once the optical code is scanned and verified by a network management system (e.g., a local or cloud-based) as being associated with a particular network device, the library of virtual objects associated with the network device can be accessed and viewed on the display of the mobile device. For example, the optical code can inform the virtual object management as to the make and model of the network device and any associated physical characteristics, such as the types, locations and sizes of the ports. This information can be used to form one or more virtual ports 634 corresponding to real port(s) of the network device accessed from a database of various types of virtual ports. Additionally, the network management system may access information related to the connectivity state of the ports. This information can be used to determine various aspects of the virtual objects that convey information related to the connectivity state of the one or more ports 634.

The overlay 600 can include a port region 632 that defines the area of the overlay 600 including the virtual ports 634. The port region 632 may or may not include a visible outline or frame. In some cases, the port region 632 has a different color and/or translucence compared to other portions of the overlay 600. The virtual ports 634 may include text, such as numbers to identify numbers of the ports. In some cases, the virtual ports 634 include one or more status indicators (e.g., 638 and 639) that indicate the connectivity state of the port. The status indicators may have a different appearance (e.g., have different colors or shapes) based on whether the port is actively connected to a computer, was previously connected to a computer within the prescribed time period, or not connected to a computer within the prescribed time period. Such status indicators (e.g., 638 and 639) may be used as in addition to or as an alternative to the filled-in quality describe above with reference to FIG. 4E.

The AR can allow for video tracking capabilities that calculate a camera's position and orientation relative to physical markers, such as the optical code on the network device, in real time. For example, once the camera's position is known, a virtual camera can be positioned at the same point, revealing a virtual object (e.g., optical code alignment frame 630) at the location of the optical code. The information from the network management system regarding the particular network device can be used to provide accurate placement and alignment of the virtual ports 634 relative to the optical code. This information can also be used to determine the relative distances between the virtual ports 634, as well as the shapes and sizes of the virtual ports 634. The information from the network management system can further be used to change aspects of the virtual objects in real time based on the connectivity state of the various ports, as described herein.

The spatial relationship between the mobile device and network device can change in real time since the user may move the mobile device with respect to the network device, thereby projecting images of the network device with different perspectives. To accommodate the changes of perspective, virtual object generation typically relies on tracking movement based on rotational degrees of freedom around fixed orthogonal axes (x, y, z axes) similar to a gimbal system. The movements may be tracked using conventional three-dimensional rotational movements such as roll (rotation about x axis), pitch (rotation about y axis) and yaw (rotation about z axis) to define six degrees of freedom. Although this model is useful, the data associated with continuously monitoring and sensing movements in real time can be high, which may cause a lag before the virtual objects are generated on the display.

In any of the embodiments described herein, the spatial relationship may be simplified by eliminating one or more of the degrees of freedom. For example, the position of the network device is substantially stable and the ports on the network device are generally oriented along a plane (e.g., on the back of the network device perpendicular to the floor). Thus, one of the three-dimensional degrees of freedom can be assumed to be fixed and eliminated from the calculations for determining the spatial relationship between the mobile device and the network device. In some embodiments, this is accomplished by filtering out (e.g., ignoring) some of the raw data associated with three-dimensional movement of the mobile device that are not necessary for calculating the relative movement of the mobile device relative to the ports. For example, in some embodiments, movements associated with roll (rotation about x axis) can be eliminated from the calculation, thereby reducing the degrees of freedom and information required for calculations by one third. Filtering the data this way can speed up the calculations so that the virtual objects (e.g., virtual ports) on the captured images can be updated more quickly. Further, this can reduce the amount of correction needed for updating each image frame, thereby resulting in the virtual object having a more stable (e.g., less shaky) location and appearance in real time.

Additionally, the AR capability may use optical feature recognition in order to determine locations for the virtual ports 634. In some examples, the optical feature recognition may be used along with or in place of the spatial relationship between the mobile device and network device. In some examples, the optical feature recognition may include optical character recognition (OCR).

More specifically, with OCR, any relevant text on the hardware (e.g., port numbers, the actual ports, etc.) may be identified by the camera to aid in the placement of the AR features in the overlay. This may mitigate some sensor drift or other alignment issues that may happen through dead reckoning or other movement-based feature overlays. Furthermore, using the OCR a specific identification information of the network device may be displayed and verified and then the virtual ports may be looked for.

For example, referring briefly back to FIG. 1, if the network device 102 is a 24-point network switch, then a text on a label of the network device 102 may be captured via OCR and can be identified as a 24 point switch. The mobile device 100 may then display the identification information namely "This is a 24-point switch." and then the virtual ports of the network device may be searched with AR overlays as mentioned previously.

In some embodiments, after the OCR is performed, the mobile device 100 may display details of the expected configuration of the network device. For example, the mobile device 100 may display a list of which ports the network device is expected to be connected to and how those should be connected by flashing a message (title) "expected" or "expected configuration" before starting to look for the ports. In various embodiments, the above steps can take place sequentially or in parallel.

Figure 7A:
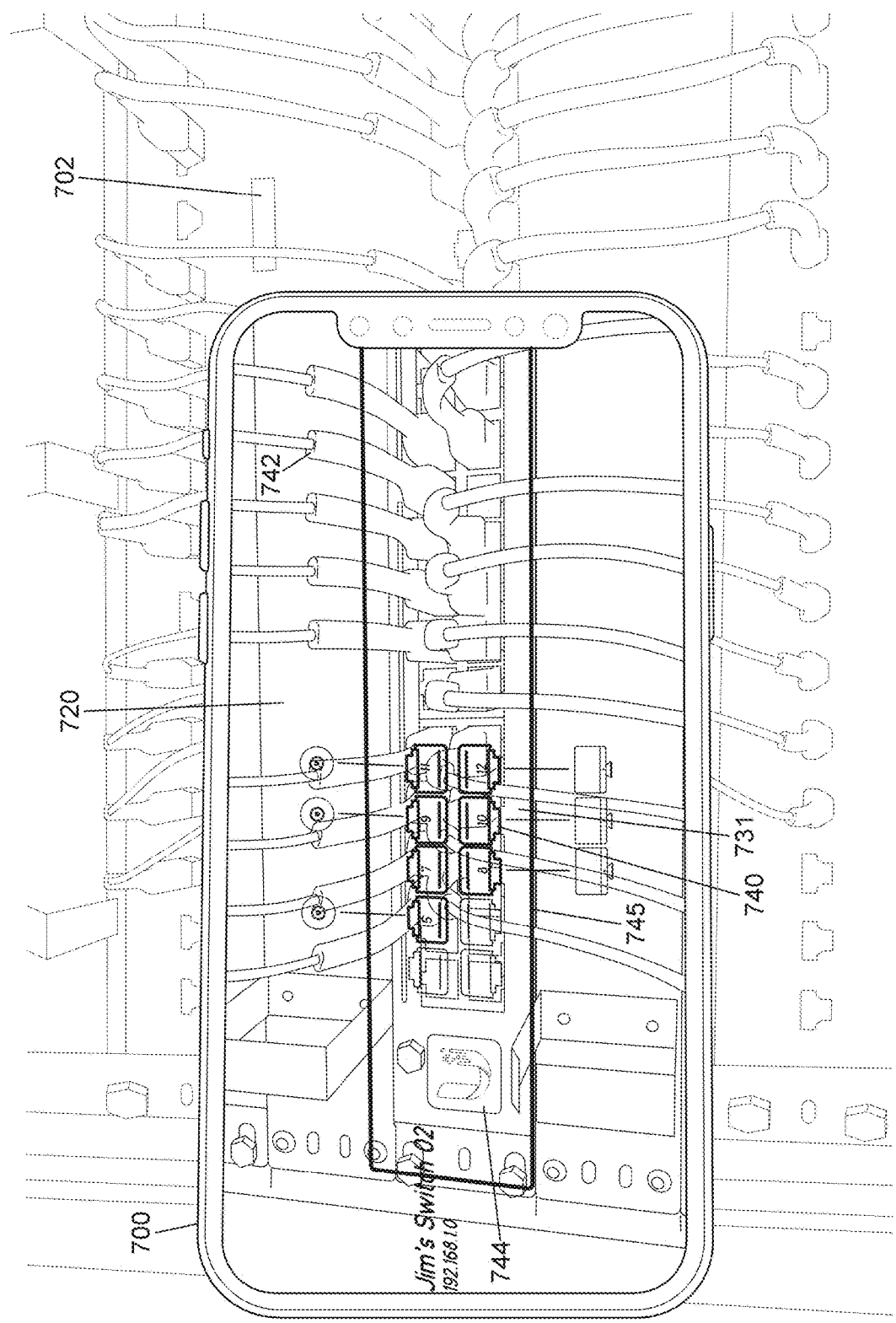
FIGS. 7A and 7B illustrate another example of user interfaces using a mobile device in AR mode.
Figure 7B:
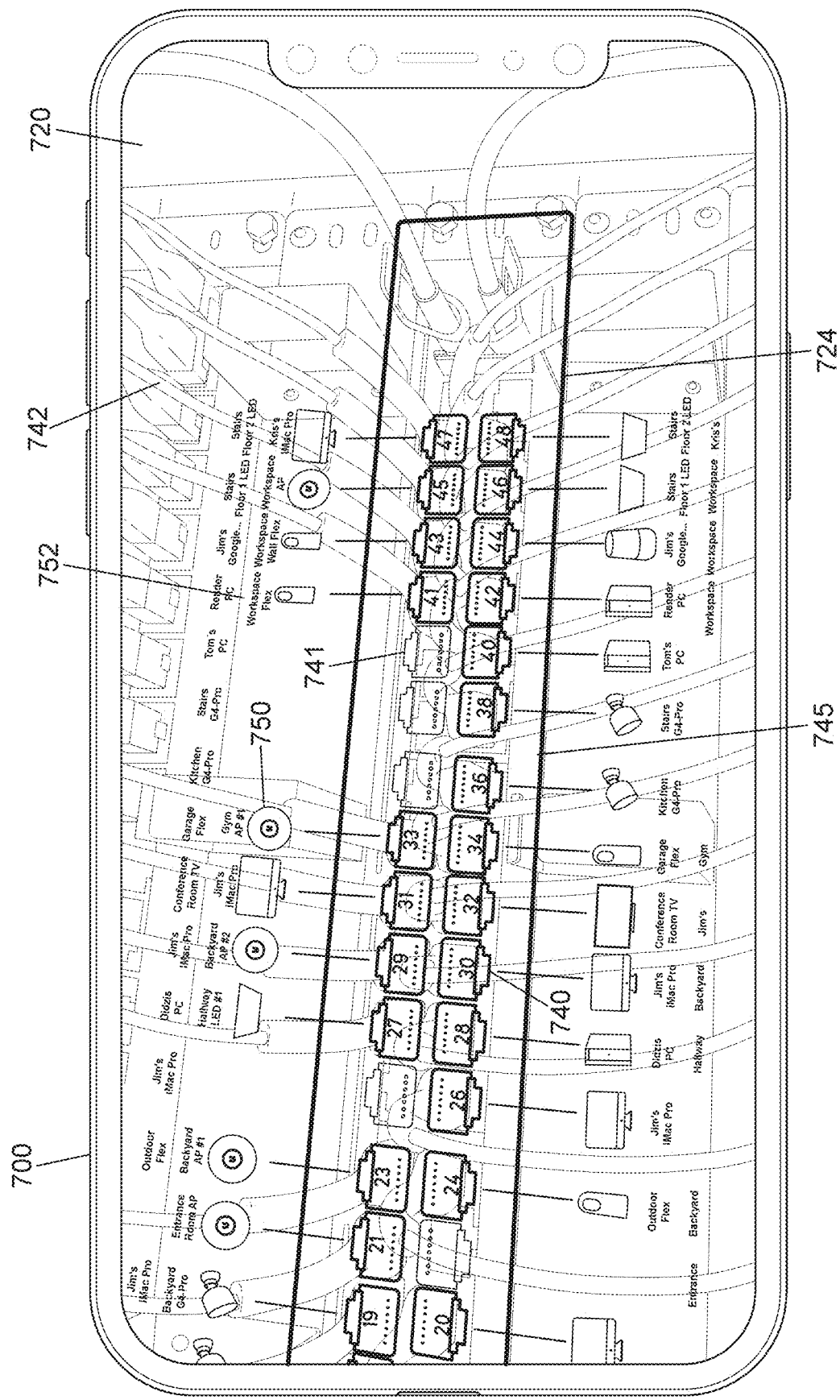

FIGS. 7A and 7B illustrate another example of a user interface 720 of a mobile device 700 in AR mode, according to some embodiments. FIGS. 7A and 7B show images of a network device 720 rendered on a display of the mobile device 700 in real time at two different perspective views. The user interface 720 may include one or more virtual objects that overlay portions of the displayed images of the network device 702. The virtual objects can include virtual ports 740 and 741, virtual cables 742, icons 750, and virtual labels 752 (e.g., text). In some cases, a port region 732 surrounding the virtual ports is outlined with a virtual line 745. The positions of the virtual objects can be configured to change in accordance with the change of perspective by the mobile device using the spatial coordinate model described herein. This way, the virtual objects may substantially maintain their alignment with corresponding objects in the captured images. Thus, the virtual ports 740 and 741, virtual cables 742, icons 750, and virtual labels 752 can appear to move as the mobile device 700 is moved relative to the network device. One or more of the virtual objects may change based on the connectivity state of corresponding one or more ports. For example, the virtual port 740 may have an outline of a first color (e.g., white) indicating that the corresponding port is connected with a device, and the virtual port 741 may have an outline of a second color (e.g., blue) indicating that the corresponding port is not connected with a device.

Figure 8:
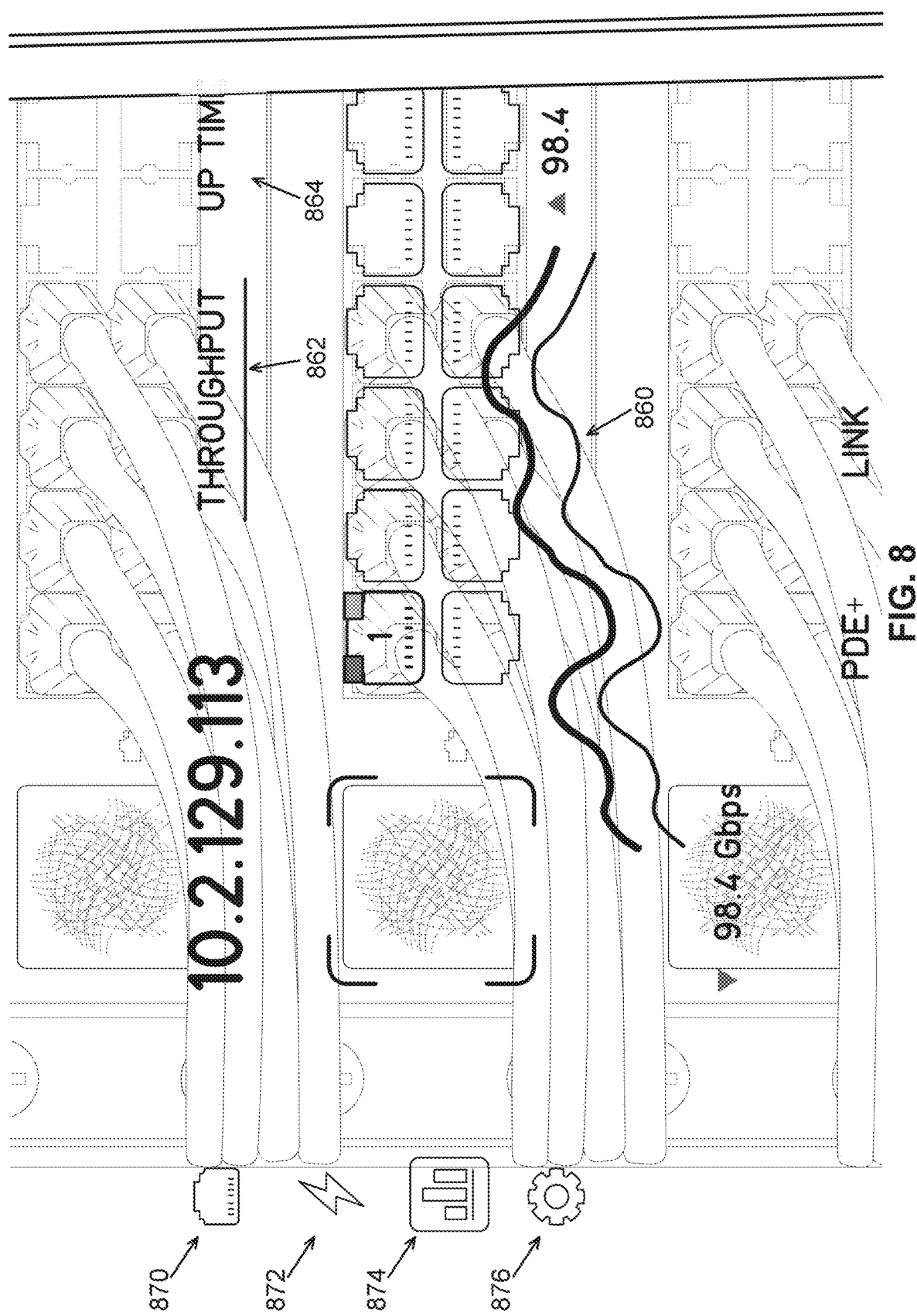
FIG. 8 illustrates an example user interface that includes various virtual objects related to performance of one or more network devices.

Any of the AR devices and methods described herein can include virtual objects that indicate the performance of the network device and/or devices connected to the network device. FIG. 8 illustrates a close up view of a user interface of a mobile device display while in AR mode showing examples of virtual objects conveying performance data. The virtual objects can include various selectable performance metrics, such as Throughput 862 and Up Time 864 of the network device. When a selectable performance metric is chosen, one or more virtual charts or graphs 860 may be displayed. In FIG. 8, the graphs 860 indicate throughput values related to the devices connected to the network device. Throughput metrics can include data related to throughput performance of devices, such as Transmission Control Protocol (TCP) throughput or file transfer time. Up Time metrics can include a percentage of time that the devices are operational. Other metrics can include internet traffic usage and/or power usage of the network device and/or the devices connected to the network device. In some cases, the metrics can include the length of time that one or more devices was connected to the network device. In some embodiments, a tree graph illustrating the various (e.g., primary, secondary, tertiary, etc.) devices that are connected to, or were once connected to, the network device. In some cases, the metrics may include usage data related to a particular user of a device. For example, a graph or chart indicating the amount of time a user used social media applications or websites can be displayed.

The user interface may include selectable virtual icons that a user can choose by touching (e.g., using a touch display of the mobile device) and/or by other selectable methods such as an electronic pencil. The virtual icons can include a port icon 870, power icon 872, performance icon 874 and settings icon 876. When the port icon 870 is selected, the various virtual ports and virtual port labels may become visible, as described herein. When the power icon 872 is selected, virtual objects related to the power supply and battery state and usage may become visible. When the performance icon 874 is selected, virtual objects related to performance such as Throughput 862 and Up Time 864 may become visible. When the settings icon 876 is selected, virtual objects related to the network setup and settings may become visible.

As described herein, the AR techniques can be based on using a three-dimensional coordinate system (3D XYZ). FIGS. 9A-9E illustrate aspects of a 3D XYZ axis system used as a basis for AR methods described herein according to some embodiments, where X represents width, Y represents height, and Z represents depth. The 3D XYZ system can assure that spatial data used to form the AR objects is comprehensible (e.g., consistent). In some embodiments, a cross-platform software engine is used to establish the 3D XYZ system. For instance, the Unity3D game engine developed by Unity Technologies based in San Francisco, Calif., U.S.A may be used. A point positioned in 3D having a width of 1 (on the X axis), a height of 4 (on the Y axis) and a depth of 3 (on the Z axis) can be presented as Vector3 {x:1, y:4, z; 3} using the Unity3D system.

Figure 9A:
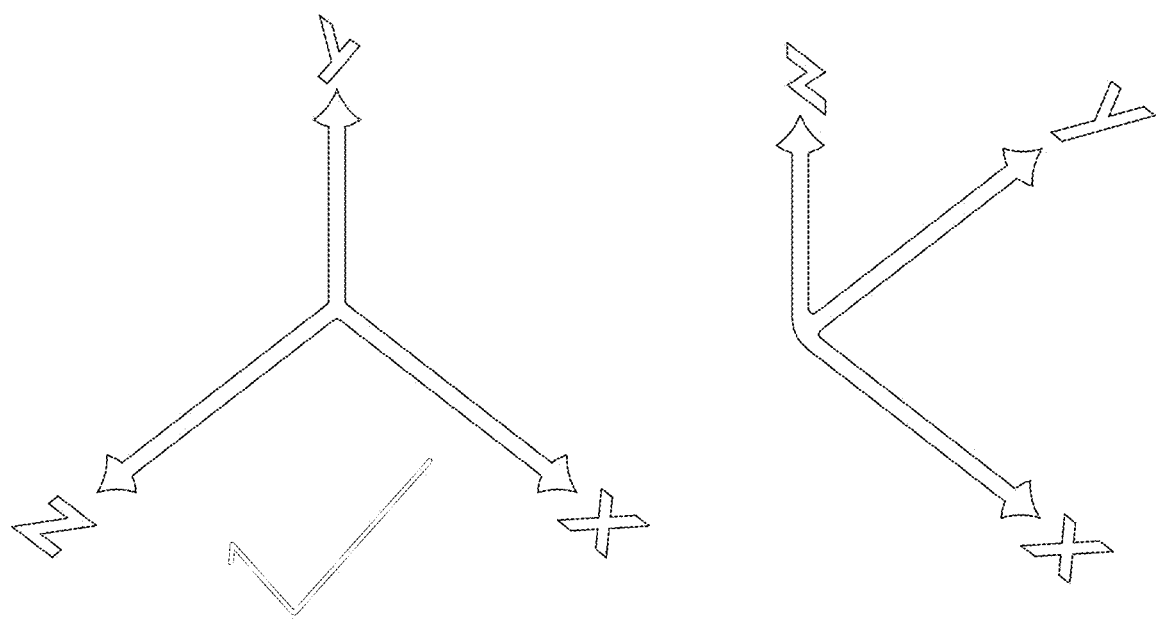
Figure 9B:
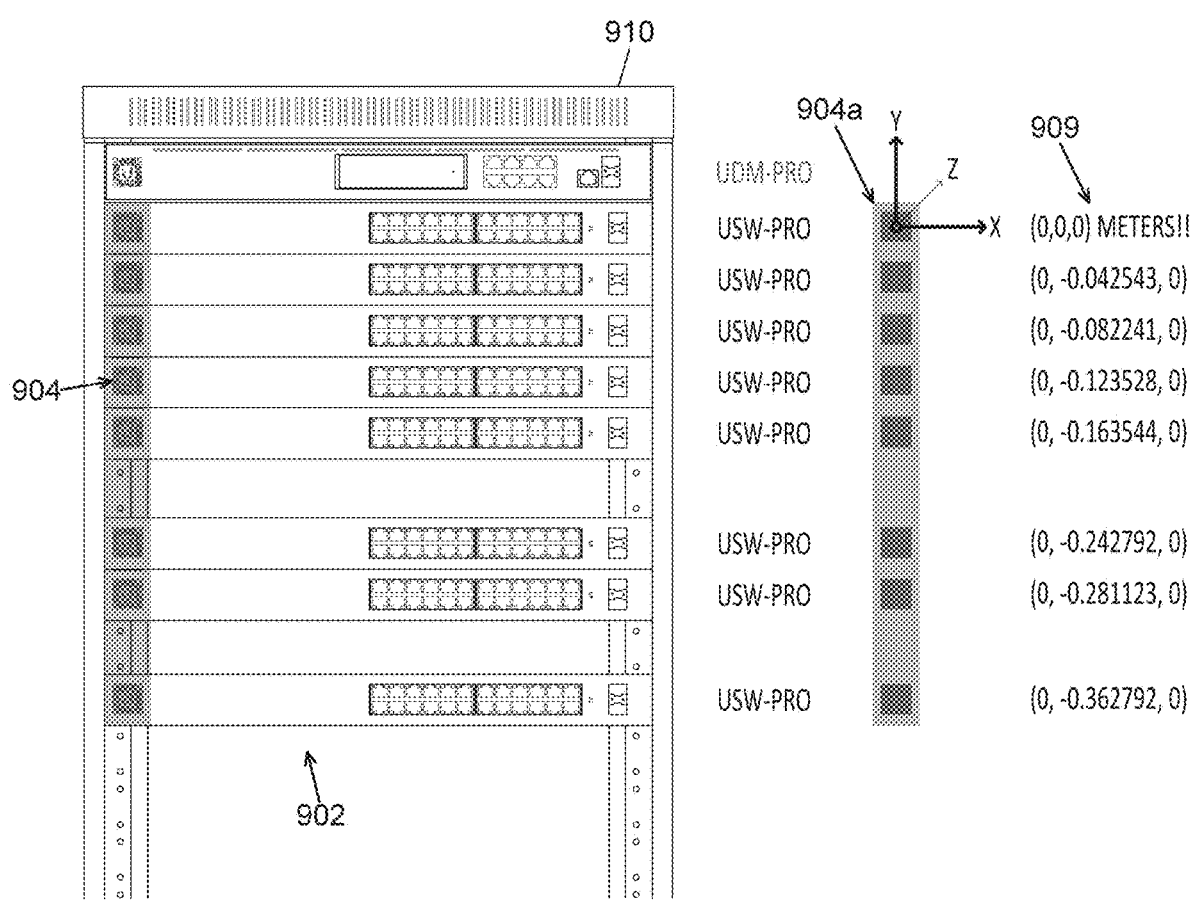

A 3D spatial record can be captured during the scanning of the optical code (e.g., see FIG. 4C1-4C4 or 5B). For example, the AR application on the mobile device (e.g., phone, tablet or headset) can use the camera and/or the orientation system (e.g., accelerometer, gyroscope and/or compass) of the mobile device to 'capture' a 3D spatial record of the network device(s) and to 'memorize' the user's rack configuration. This 3D spatial capturing may be a one-time setup. FIG. 9B illustrates an example of a 3D spatial record for a rack 910 of network devices 902. The spatial record of each of the network devices 902 can be established as sets 909 of vectors in a 3D XYZ coordinate system. The 3D spatial record corresponds to a group of normalized positions (e.g., Vector3) based on trackers that keeps its Local Position. The 3D spatial record may be filtered, as described herein. In one implementation of filtering, the Local Position can be considered to be on a 'panel' (e.g., 2D surface) since the orientation of the network device is typically fixed (e.g., having a bottom surface that is parallel to the ground) so that there is substantially no rotation about the X axis. One of the trackers may be designated as the origin point for the spatial record, and the relative locations of other trackers can be recorded relative to this origin point. For instance, a first optical code 904a (e.g., first scanned) may be designated as having the origin point, and the relative locations of the remainder of the optical codes 904 (e.g., subsequently scanned) may be recorded relative to the first optical code 904a. In some cases, the top optical code 904a is designated as the origin point. The coordinate system may be based on any unit of measurement. In some embodiments, the coordinate system is based the metric system (e.g., meter). It is noted that the in some embodiments, a Vector1 or Vector2 structure may be used instead of Vector3. However, in some cases Vector3 may provide more ability to support more complex network device layouts.

Figure 9D:
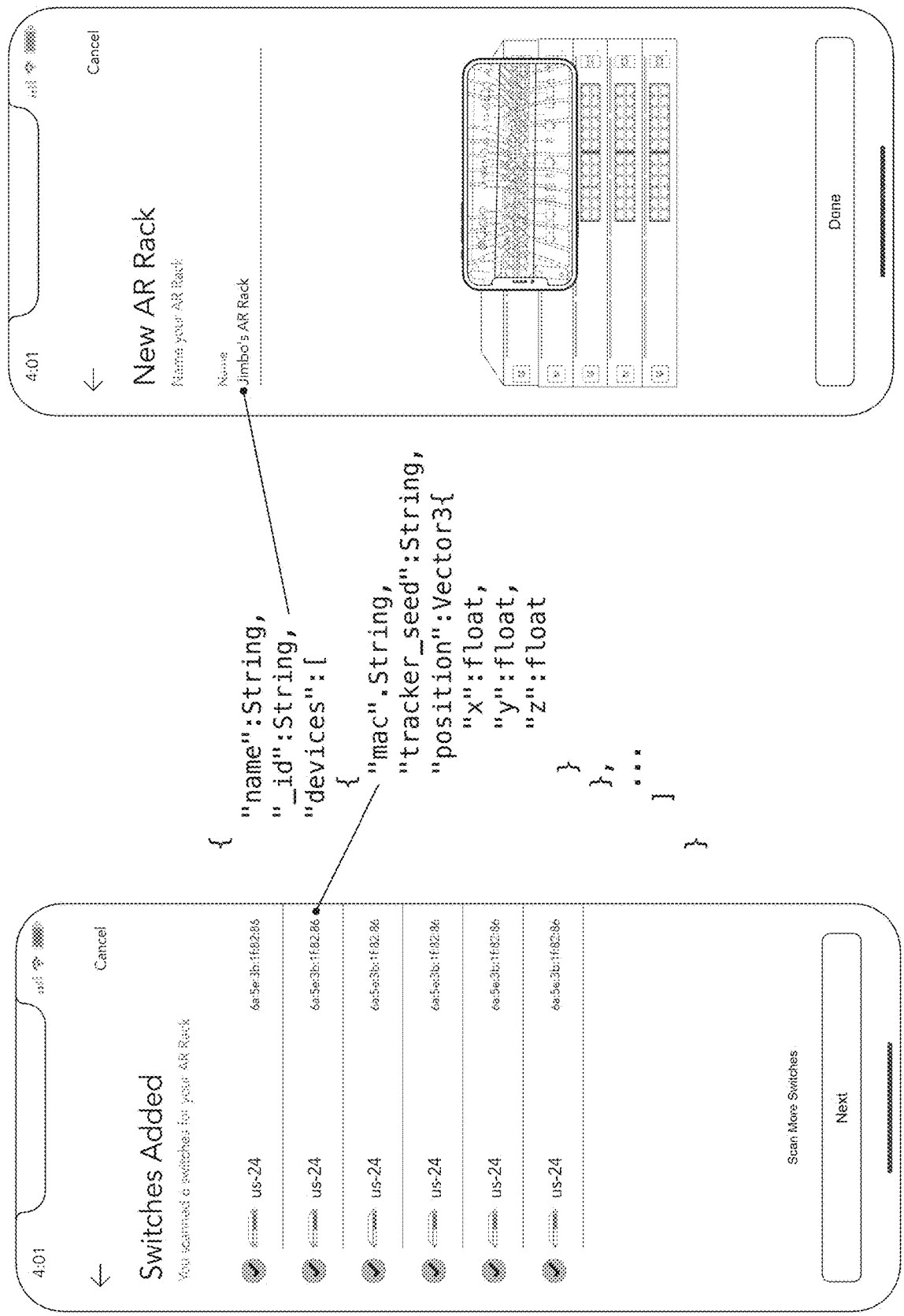

The data can flow between the 3D XYZ platform and a native code of the mobile device, such as Swift or Java. FIG. 9C shows an example of JavaScript Object Notation (JSON) code for setting up a network device. FIG. 9D illustrates an example of using a hypertext transfer protocol (HTTP) request made in a native code, and using additional data (rack_name for racks and the names and model numbers for the network devices) for the user interface during the spatial record capturing process. FIG. 9E illustrates and example JSON code for setting up multiple network devices.

FIGS. 10A-10D illustrate a flowchart 1000 and corresponding architecture map 1100 representing an example process for setting up and using an AR application, in accordance with some embodiments. Each of the steps in the flowchart 1000 include an indication of a corresponding architecture component (e.g., Swift, Unity AR, Network Controller or USW/LCM) in the corresponding map 1100. The map 1100 indicates the interaction of the Network Controller, Swift, Unity AR, USW and LCM components.

Figure 10A:
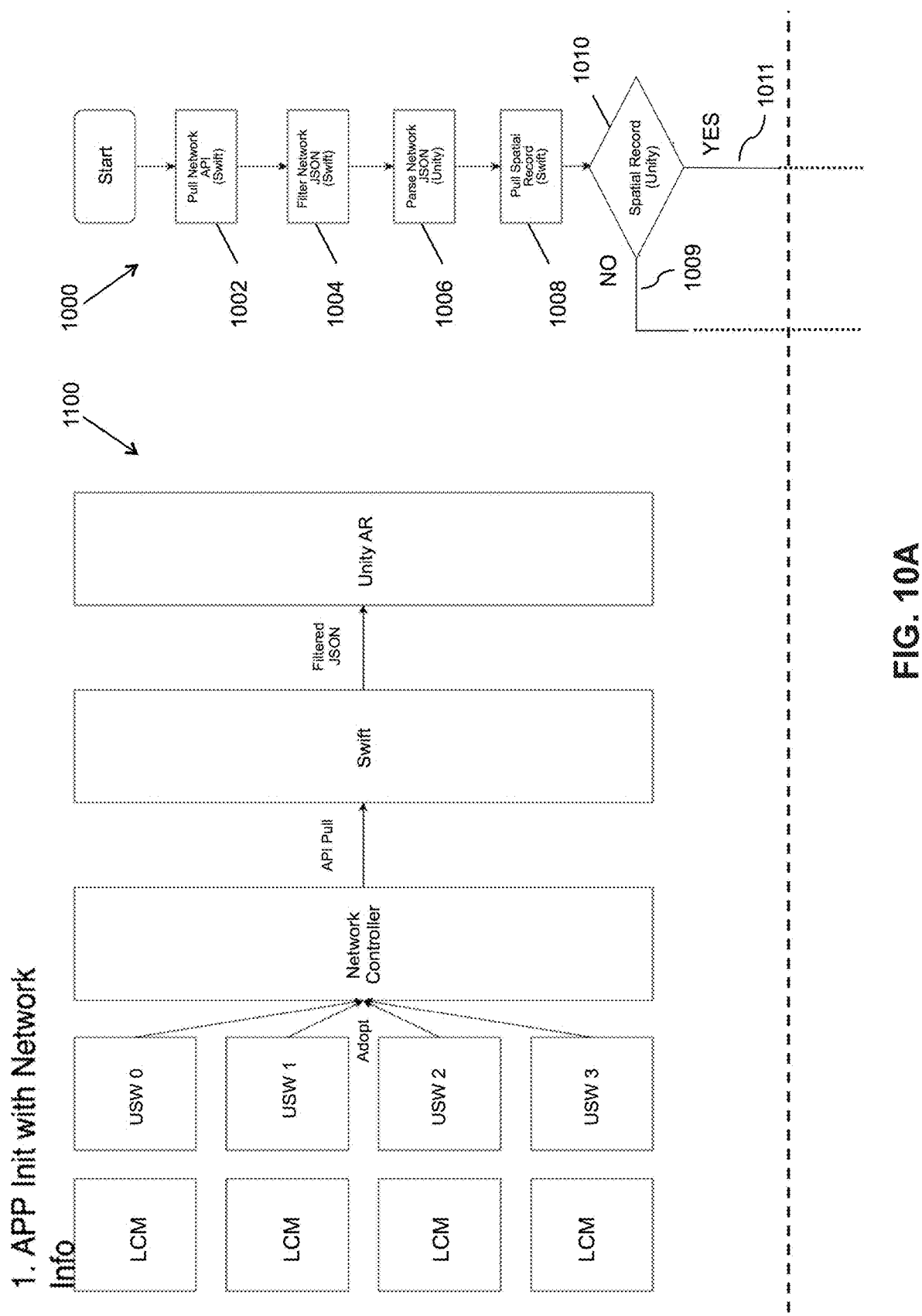

FIG. 10A illustrates a portion of the flowchart 1000 and map 1100 corresponding to the application initialization with network information. Referring to the flowchart 1000, at 1002 the user can use a mobile device to pull a Network application programming interface (API) for the AR application from the network controller to the Swift component. At 1004 the Network JSON is filtered, for example, one or more of the filtering methods described herein. At 1006, the Network JSON data is parsed at the Unity AR component. At 1008 the Spatial Record is pulled by the Swift component. At 1010, if the Spatial Record is successfully pulled (Yes), the process continues at FIG. 10D, and if the Spatial Record is not successfully pulled (No), the process continues at FIG. 10B.

Figure 10B:
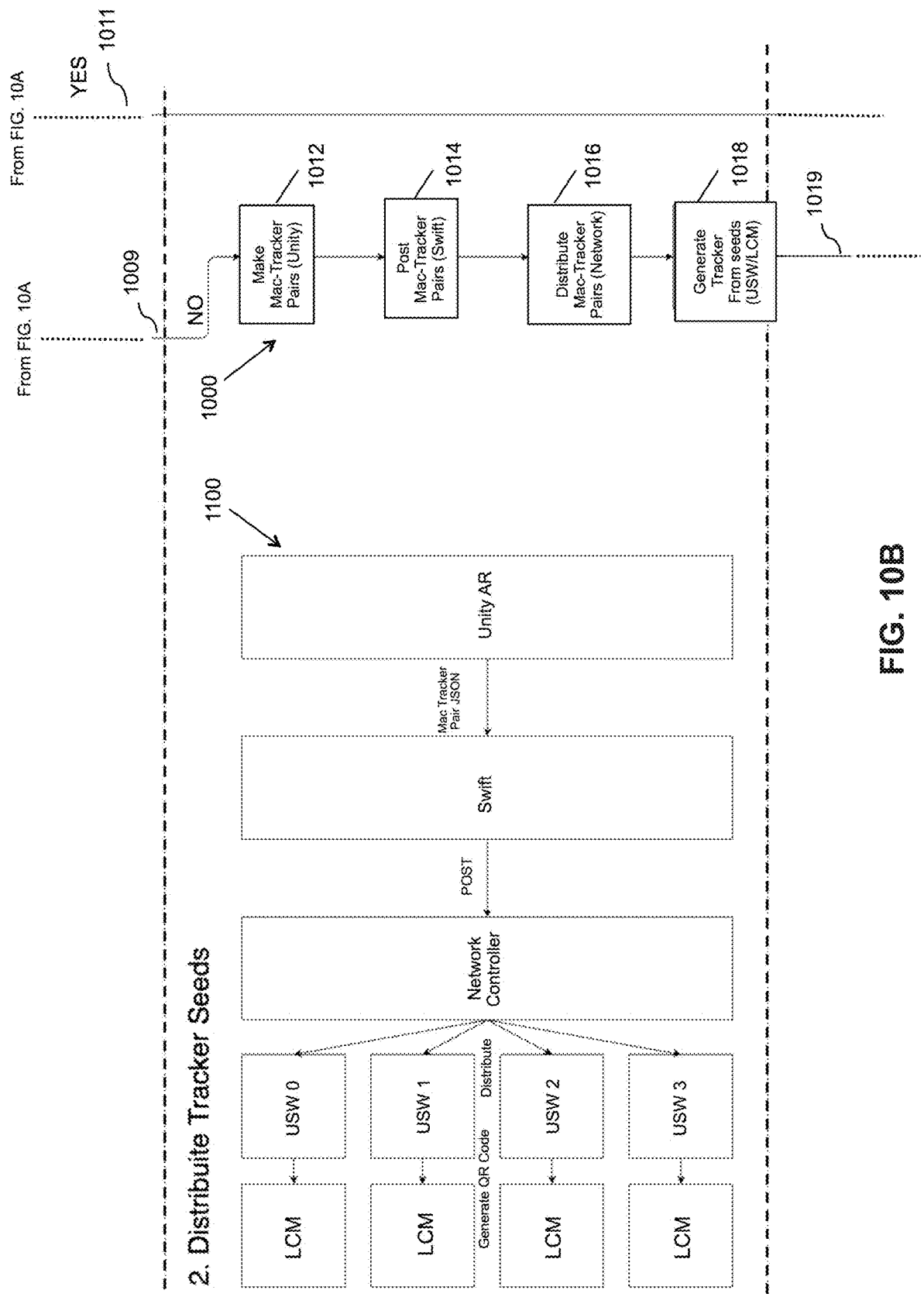

FIG. 10B illustrates a portion of the flowchart 1000 and map 1100 corresponding to distributing tracker seeds. Referring to flowchart 1000, if it is determined that the Spatial Record is not successfully pulled (No) in FIG. 10A, at 1012 Mac-Tracker Pairs are made by the Unity AR component and sent to the Swift component. At 1014 the Mac-Tracker Pairs are posted on the network controller by the Swift component. At 1016 the Mac-Tracker Pairs are distributed to the LCMs and USWs, and at 1018 the tracker is generated from seeds (e.g., to generate QR codes).

FIG. 10C illustrates a portion of the flowchart 1000 and map 1100 corresponding to the setup (e.g., one-time setup) for storing the spatial record. Referring to flowchart 1000, at 1020 the trackers are scanned and used to write the spatial record and sent to the Swift component. At 1022 the spatial record is put into the network controller, and at 1024 the spatial record is received and stored by the network controller.

Figure 10D:
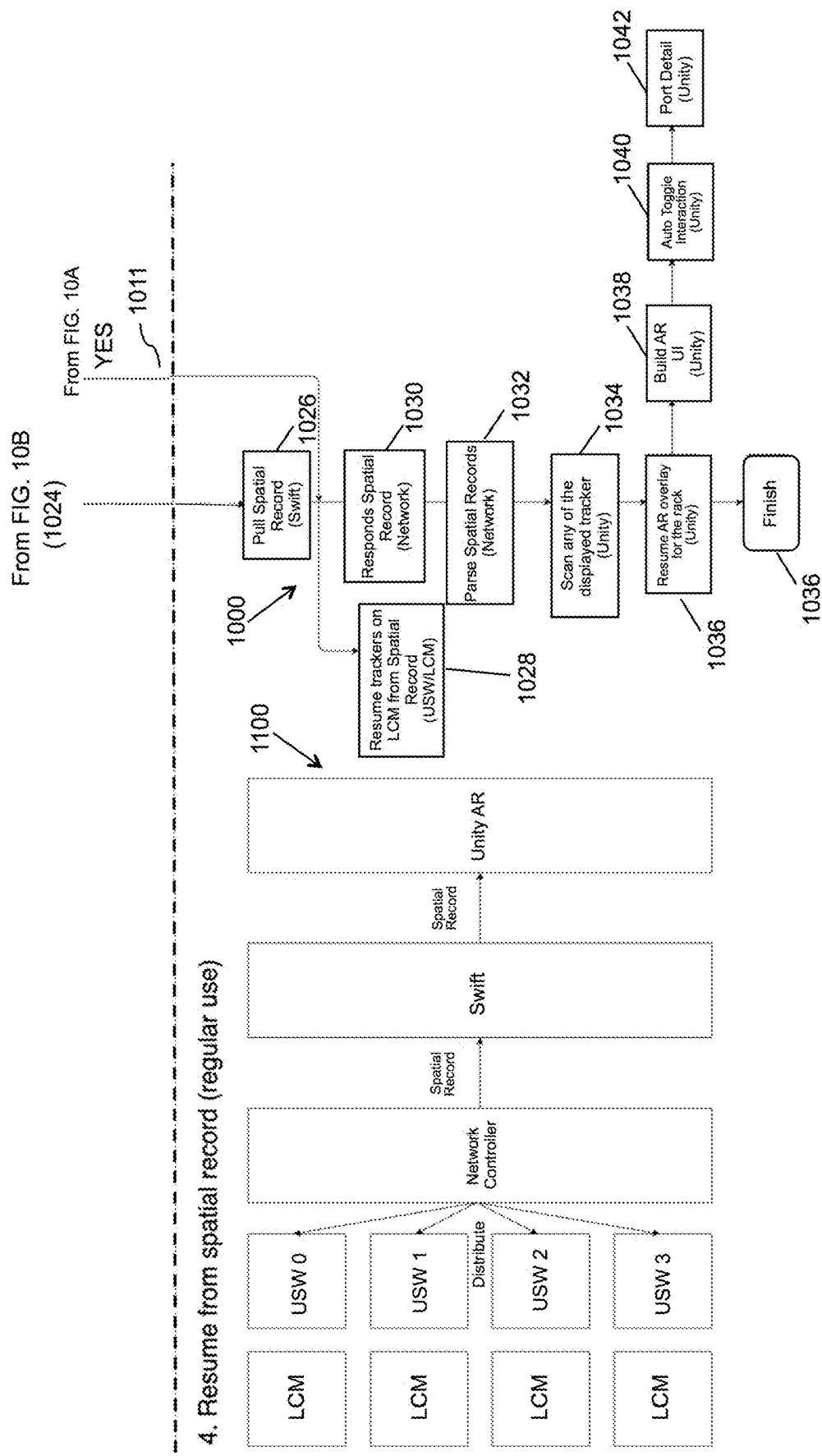

FIG. 10D illustrates a portion of the flowchart 1000 and map 1100 corresponding to resuming regular use of the mobile device and using the AR application based on the Spatial Record. Referring to flowchart 1000, at 1026 the spatial record is pulled by the Swift component so that trackers on the LCM from the Spatial Record (USW/LCM) can resume. Additionally, the Network Controller responds to the Spatial Record at 1030. At 1032 the Spatial Record is parsed at the Unity AR component, and at 1034 any of the displayed trackers can be scanned. At 1036 the AR overlay for the rack may resume at the Unity AR component, to build an AR user interface (1038), with auto-toggle interaction (1040) and to render port detail (1042).

Although many of the examples described herein related to network devices such as switches, routers, and wireless access points, the AR techniques described herein are not limited to these types of devices. For example, the AR techniques described herein may be used to view any type of computer or other device capable of connecting to one or more computer networks. In some cases, the AR techniques described herein are used to render hidden connectivity aspects of mobile devices such as mobile phones, tablets, laptops or headsets. The AR techniques described herein may be used to render hidden connectivity aspects of wireless communication features (i.e., not limited to hardware ports). For example, connectivity aspects related to one or more antennae (e.g., radio frequency or Bluetooth chips) may be rendered with AR objects.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art at references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of displaying a network device with augmented reality using a mobile device, the method comprising:

receiving an identifying code from the network device by the mobile device;

displaying captured camera images of the network device on a display of the mobile device, the images including a plurality of ports of the network device;

retrieving information associated with a connectivity state of each of the plurality of ports using the identifying code, wherein the retrieved information includes a database of identities of devices coupled to each of the plurality of ports and a library of virtual objects corresponding to the coupled devices;

determining, based on the retrieved database, identities of the devices coupled to each of the plurality of ports;

determining a spatial relationship of the mobile device with respect to the one or more ports using the identifying code;

overlaying one or more virtual ports over the network device on the images, wherein the virtual ports include information about the connectivity state of the network device in the one or more virtual ports; and displaying icons of the coupled devices adjacent to the virtual ports, wherein the icons are displayed based on the determined identities of the devices coupled to each of the plurality of ports.

2. The method of claim 1, wherein an alignment of the one or more virtual ports with respect to the camera images is dynamically adjusted based on the determined spatial relationship.

3. The method of claim 1, further wherein each of the virtual ports indicates the connectivity state of the port based on the retrieved information.

4. The method of claim 1, further comprising overlaying a virtual label on the image proximate to each of the virtual ports, the virtual label including text indicating one or more characteristics of a device connected to each of the ports corresponding to each of the virtual ports.

5. The method of claim 1, wherein each of the virtual ports has a size and shape that substantially matches that of the image of the one or more ports.

6. The method of claim 1, wherein a position of the virtual port dynamically changes in accordance with perspective changes of a camera of the mobile device with respect to the network device.

7. The method of claim 1, wherein each of the virtual ports has a different appearance when a corresponding port in the network device is connected, as compared to when the corresponding port is not connected to a device.

8. The method of claim 1, further comprising accessing the library of virtual objects based on the information associated with connectivity state of the port, the virtual objects including one or more icons corresponding to a type of device connected to one or more ports of the network device.

9. The method of claim 8, wherein the type of the device is a mobile phone, a tablet computer, a laptop computer, a desktop computer, a wireless access point device, a virtual assistant device, a television, a home appliance, or a security system device.

10. The method of claim 8, wherein the one or more icons has a different appearance when the port is connected to the device compared to when the port was previously connected and is no longer connected to the device.

11. The method of claim 1, wherein determining the spatial relationship of the mobile device with respect to the network device comprises filtering out movement data from calculations to determine the spatial relationship.

12. The method of claim 11, wherein filtering out movement data comprises eliminating movement data associated with rotation about an axis in coordinate space.

13. The method of claim 1, wherein the identifying code is an optical code that is on a touch display of the network device.

14. The method of claim 1, wherein the identifying code is an RF code.

15. The method of claim 1, wherein the connectivity state of the port includes whether the port is connected to the device.

16. The method of claim 1, wherein the connectivity state of the port includes information associated with an operating status of a computer connected to the port or that was connected to the port.

17. The method of claim 1, wherein the connectivity state of the port includes information as to whether a device that is connected or was connected to the port is connected to a second device.

18. The method of claim 17, wherein the connectivity state of the port includes an operating status of the device and an operating status of the second device.

19. The method of claim 1, wherein the mobile device is a mobile phone, tablet computer, laptop computer or headset.

20. The method of claim 1, wherein the network device is a network switch, router or access point.

21. The method of claim 1, further comprising dynamically adjusting the overlay of the one or more virtual ports.

22. A method of displaying a network device with augmented reality using a mobile device, the method comprising:

displaying captured camera images of the network device on a display of the mobile device, the images including: one or more ports of the network device, and an optical code on the network device that includes network connectivity information associated with the network device;

retrieving information associated with a connectivity state of the one or more ports using the optical code, wherein the retrieved information includes a database of identities of devices coupled to each of the one or more ports and a library of virtual objects corresponding to the coupled devices;

determining, based on the retrieved database, identities of the devices coupled to each of the one or more ports;

accessing a library of virtual objects based on the information associated with connectivity state of the one or more ports, the virtual objects including an icon corresponding to a type of device connected to each of the one or more ports of the network device;

determining a spatial relationship of the mobile device with respect to the one or more ports using the optical code;

overlaying one or more virtual ports, wherein the virtual ports each include the icon corresponding to the type of device connected to the one or more ports, over the image of the network device, wherein a quality of the virtual port indicates the connectivity state of the port based on the retrieving information; and simultaneously displaying icons of the coupled devices adjacent to the virtual ports, wherein the icons are displayed based on the determined identities of the devices coupled to each of the one or more of ports.

23. A system for displaying a network device with augmented reality using a mobile device, the system comprising:

one or more processors;

memory coupled to the one or more processors, the memory configured to store computer-program instructions, that, when executed by the one or more processors, perform a computer-implemented method comprising:

receiving an identifying code from the network device by the mobile device;

displaying captured camera images of the network device on a display of the mobile device, the images including a plurality of ports of the network device;

retrieving information associated with a connectivity state of each of the plurality of ports using the identifying code, wherein the retrieved information includes a database of identities of devices coupled to each of the plurality of ports and a library of virtual objects corresponding to the coupled devices;

determining, based on the retrieved database, identities of the devices coupled to each of the plurality of ports;

determining a spatial relationship of the mobile device with respect to the one or more ports using the identifying code;

overlaying one or more virtual ports over the network device on the images, wherein the virtual ports include information about the connectivity state of the network device in the one or more virtual ports; and simultaneously displaying icons of the coupled devices adjacent to the virtual ports, wherein the icons are displayed based on the determined identities of the devices coupled to each of the plurality of ports.

* * * * *